US012321706B2

(12) United States Patent
Shakeri et al.

(10) Patent No.: US 12,321,706 B2
(45) Date of Patent: Jun. 3, 2025

(54) SOFT KNOWLEDGE PROMPTS FOR LANGUAGE MODELS

(71) Applicant: Google LLC, Mountain View, CA (US)

(72) Inventors: Siamak Shakeri, New York City, NY (US); Cicero Nogueira dos Santos, Glen Ridge, NJ (US); Daniel Matthew Cer, Santa Clara, CA (US); Zhe Dong, Zurich (CH); Jianmo Ni, Santa Clara, CA (US); Yun-Hsuan Sung, San Francisco, CA (US); John Nham, Fremont, CA (US)

(73) Assignee: Google LLC, Mountain View, CA (US)

( * ) Notice: Subject to any disclaimer, the term of this patent is extended or adjusted under 35 U.S.C. 154(b) by 141 days.

(21) Appl. No.: 18/166,806

(22) Filed: Feb. 9, 2023

(65) Prior Publication Data
US 2024/0273294 A1    Aug. 15, 2024

(51) Int. Cl.
*G06F 40/295*    (2020.01)
(52) U.S. Cl.
CPC .................. *G06F 40/295* (2020.01)
(58) Field of Classification Search
CPC ...... G06F 40/30; G06F 40/284; G06F 40/295; G06F 40/40; G06F 16/3329; G06F 16/35; G06F 16/367; G06F 40/216; G06F 16/3344; G06F 40/137; G06F 40/205; G06F 40/211; G06F 18/214; G06F 40/20; G06F 40/289;
(Continued)

(56) References Cited

U.S. PATENT DOCUMENTS

2017/0125013 A1* 5/2017 Yan .................. G10L 15/197
2022/0230628 A1* 7/2022 Zhu .................. G10L 15/063
(Continued)

FOREIGN PATENT DOCUMENTS

CN    111639171 A    9/2020
CN    114372146 A    4/2022
(Continued)

OTHER PUBLICATIONS

Agarwal, Oshin, et al., "Knowledge Graph Based Synthetic Corpus Generation for Knowledge-Enhanced Language Model Pre-training", In Proceedings of the 2021 Conference of the North American Chapter of the Association for Computational Linguistics: Human Language Technologies, pp. 3554-3565.
(Continued)

*Primary Examiner* — Abdelali Serrou
(74) *Attorney, Agent, or Firm* — Botos Churchill IP Law

(57) ABSTRACT

The technology employs soft knowledge prompts (KPs) to inject relevant world knowledge into language models. This includes training KPs via self-supervised learning on data from one or more knowledge bases. KPs are task independent and can function as an external memory of the language models. KPs may be entity-centric, meaning that each prompt primarily encodes information about one entity from a given knowledge base. A method includes identifying a KP in response to a received input text, concatenating that KP to a sequence of word embeddings of the input text, applying the concatenated information to a trained language model, predicting an object entity name, computing a cross-entropy loss, and updating the identified KP based on the computed cross-entropy loss.

21 Claims, 18 Drawing Sheets

(58) Field of Classification Search
CPC .... G06F 40/56; G06F 16/319; G06F 18/2415; G06F 18/24; G06F 18/295; G06F 40/12; G06F 40/194; G06F 40/279; G06F 16/24522; G06F 16/25; G06F 16/353; G06F 16/355; G06F 16/7844; G06F 16/90344; G06F 17/16; G06F 17/18; G06F 18/22; G06F 18/25; G06F 40/237; G06F 40/247; G06F 40/35; G06F 40/58

See application file for complete search history.

(56) References Cited

U.S. PATENT DOCUMENTS

| | | | | |
|---|---|---|---|---|
| 2023/0419037 | A1* | 12/2023 | Chen | G06F 40/295 |
| 2024/0070394 | A1* | 2/2024 | Peng | G06F 40/40 |
| 2024/0073159 | A1* | 2/2024 | Bhatia | G06F 16/3329 |
| 2024/0211501 | A1* | 6/2024 | Zhang | G06F 16/3344 |

FOREIGN PATENT DOCUMENTS

| | | |
|---|---|---|
| CN | 114647723 A | 6/2022 |
| CN | 115221331 A | 10/2022 |
| CN | 115438149 A | 12/2022 |

OTHER PUBLICATIONS

Bordes, Antoine, et al., "Large-scale Simple Question Answering with Memory Networks", arXiv:1506.02075v1 [cs.LG] Jun. 5, 2015.

Dai, Damai, et al., "Knowledge Neurons in Pretrained Transformers", arXiv:2104.08696v2 [cs.CL] Mar. 10, 2022, 10 pages.

De Jong, Michiel, et al., "Mention Memory: Incorporating Textual Knowledge Into Transformers Through Entity Mention Attention", Published as a conference paper at ICLR 2022, 15 bages.

Devlin, Jacob, et al., "BERT: Pre-training of Deep Bidirectional Transformers for Language Understanding", In Proceedings of the 2019 Conference of the North American Chapter of the Association for Computational Linguistics: Human Language Technologies, vol. 1 (Long and Short Papers), pp. 4171-4186.

Diefenbach, Dennis, et al., "Question Answering Benchmarks for Wikidata", In Proceedings of the ISWC 2017 Posters & Demonstrations and Industry Tracks co-located with 16th International Semantic Web Conference (ISWC 2017), Vienna, Austria, Oct. 23 to 25, 2017, 4 pages.

Févry, Thibault, et al., "Entities as Experts: Sparse Memory Access with Entity Supervision", Proceedings of the 2020 Conference on Empirical Methods in Natural Language Processing, pp. 4937-4951, Nov. 16-20, 2020.

Florez, Omar U, et al., "Aging Memories Generate More Fluent Dialogue Responses with Memory Augmented Neural Networks", arXiv:1911.08522v2 [cs.CL] Sep. 27, 2020, 10 pages.

Guu, Kelvin, et al., "REALM: Retrieval-Augmented Language Model Pre-Training", arXiv:2002.08909v1 [cs.CL] Feb. 10, 2020.

Hambardzumyan, Karen, et al., "WARP: Word-level Adversarial ReProgramming", In Proceedings of the 59th Annual Meeting of the Association for Computational Linguistics and the 11th International Joint Conference on Natural Language Processing (vol. 1: Long Papers), May 2021, pp. 4921-4933.

Heinzerling, Benjamin, et al., "Language Models as Knowledge Bases: On Entity Representations, Storage Capacity, and Paraphrased Queries", SymarXiv:2008.09036v2 [cs.CL] Apr. 21, 2021, 22 pages.

Joshi, Mandar, et al., "TriviaQA: A Large Scale Distantly Supervised Challenge Dataset for Reading Comprehension", In Proceedings of the 55th Annual Meeting of the Association for Computational Linguistics (vol. 1: Long Papers), 2017, pp. 1601-1611.

Lester, Brian, et al., "The Power of Scale for Parameter-Efficient Prompt Tuning", arXiv:2104.08691v2 [cs.CL] Sep. 2, 2021, 15 pages.

Li, Xiang Lisa, et al., "Prefix-Tuning: Optimizing Continuous Prompts for Generation", Proceedings of the 59th Annual Meeting of the Association for Computational Linguistics and the 11th International Joint Conference on Natural Language Processing, pp. 4582-4597, Aug. 1-6, 2021.

Panigrahy, Rina, et al., "Sketch based Memory for Neural Networks", Proceedings of the 24th International Conference on Artificial Intelligence and Statistics (AISTATS) 2021, San Diego, California, USA, 12 pages.

Peters, Matthew E, et al., "Knowledge Enhanced Contextual Word Representations", In Proceedings of the 2019 Conference on Empirical Methods in Natural Language Processing and the 9th International Joint Conference on Natural Language Processing (EMNLP-IJCNLP), pp. 43-54, Hong Kong, China.

Poerner, Nina, et al., "E-BERT: Efficient-Yet-Effective Entity Embeddings for BERT", In Findings of the Association for Computational Linguistics: EMNLP 2020, pp. 803-818.

Radford, Alec, et al., "Language Models are Unsupervised Multitask Learners", 2019, available at https://www.semanticscholar.org/paper/Language-Models-are-Unsupervised-Multitask-Learners-Radford-Wu/9405cc0d6169988371b2755e573cc28650d14dfe, 24 pages.

Raffel, Colin, et al., "Exploring the Limits of Transfer Learning with a Unified Text-to-Text Transformer", Journal of Machine Learning Research 21 (2020), arXiv:1910.10683v3 [cs.LG] Jul. 28, 2020, pp. 1-67.

Roberts, Adam, et al., "How Much Knowledge Can You Pack Into the Parameters of a Language Model?", In Proceedings of the 2020 Conference on Empirical Methods in Natural Language Processing (EMNLP), pp. 5418-5426.

Runge, Andrew, et al., "Exploring Neural Entity Representations for Semantic Information", arXiv:2011.08951v1 [cs.CL] Nov. 17, 2020, 13 pages.

Safavi, Tara, et al., "Relational World Knowledge Representation in Contextual Language Models: A Review", arXiv:2104.05837v2 [cs.CL] Sep. 10, 2021, 15 pages.

Sciavolino, Christopher, et al., "Simple Entity-Centric Questions Challenge Dense Retrievers", In Proceedings of the 2021 Conference on Empirical Methods in Natural Language Processing, pp. 6138-6148.

Sukhbaatar, Sainbayar, et al., "End-To-End Memory Networks", arXiv:1503.08895v5 [cs.NE] Nov. 24, 2015, 11 pages.

Sun, Tianxiang, et al., "CoLAKE: Contextualized Language and Knowledge Embedding", In Proceedings of the 28th International Conference on Computational Linguistics, 2020, pp. 3660-3670.

Taylor, Wilson L, ""Cloze Procedure": A New Tool for Measuring Readability", Journalism & Mass Communication Quarterly, 1953, 30:415-433.

Thorne, James, et al., "FEVER: a large-scale dataset for Fact Extraction and VERification", In Proceedings of the 2018 Conference of the North American Chapter of the Association for Computational Linguistics: Human Language Technologies, vol. 1 (Long Papers), pp. 809-819, New Orleans, Louisiana. Association for Computational Linguistics.

Van Der Maaten, Laurens, et al., "Visualizing Data using t-SNE", Journal of Machine Learning Research, 2008, 9(86):2579-2605.

Verga, Pat, et al., "Adaptable and Interpretable Neural Memory Over Symbolic Knowledge", In Proceedings of the 2021 Conference of the North American Chapter of the Association for Computational Linguistics: Human Language Technologies, 2021, pp. 3678-3691.

Vrandecic, Denny, et al., "Wikidata: A Free Collaborative Knowledgebase", Communications of the ACM vol. 57, Issue 10, 2014, pp. 78-85.

Wang, Xiaozhi, et al., "Kepler: A Unified Model for Knowledge Embedding and Pre-trained Language Representation", Transactions of the Association for Computational Linguistics, 2021, 9:176-194.

Zemlyanskiy, Yury, et al., "Readtwice: Reading Very Large Documents with Memories", NarraarXiv:2105.04241v2 [cs.CL] May 11, 2021, 10 pages.

Zhang, Zhengyan, et al., "ERNIE: Enhanced Language Representation with Informative Entities", In Proceedings of the 57th Annual

(56) References Cited

OTHER PUBLICATIONS

Meeting of the Association for Computational Linguistics, Florence, Italy, 2019, pp. 1441-1451.
Zhang, Yuhao, et al., "Position-aware Attention and Supervised Data Improve Slot Filling", In Proceedings of the 2017 Conference on Empirical Methods in Natural Language Processing, pp. 35-45, Copenhagen, Denmark. Association for Computational Linguistics.
International Search Report and Written Opinion for corresponding International Application No. PCT/US2024/012850 dated May 31, 2024 (9 pages).

* cited by examiner

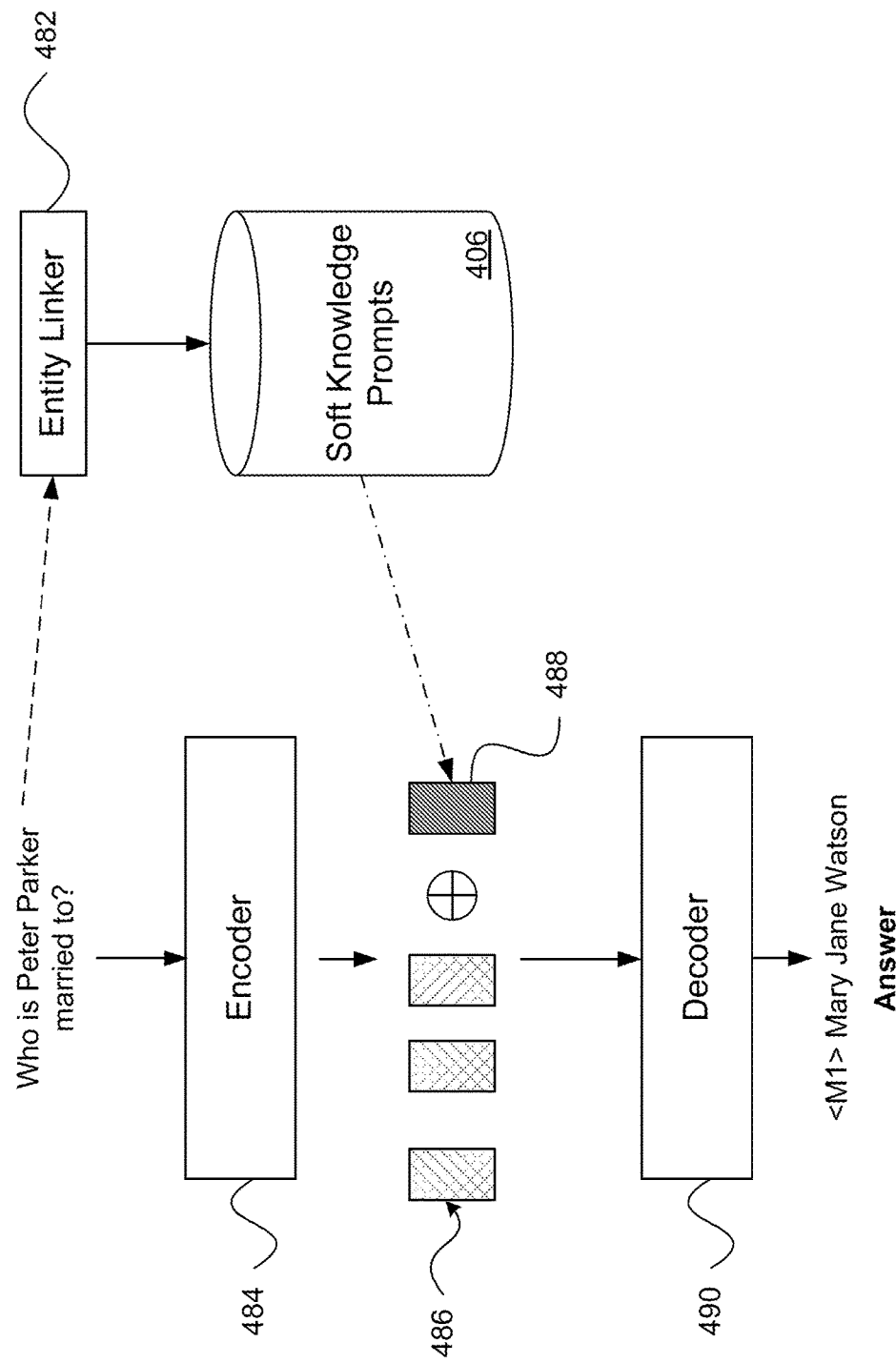

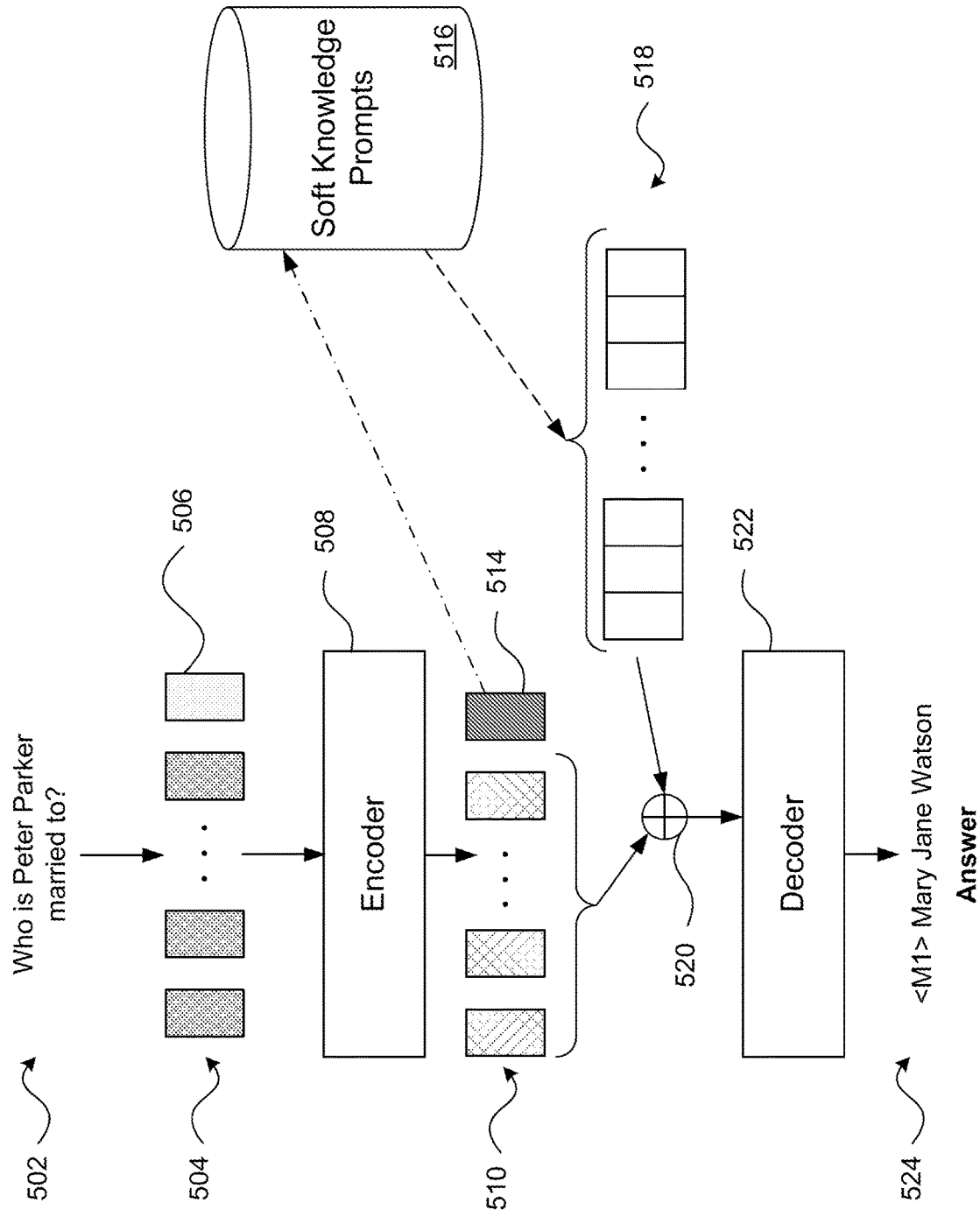

FIG. 7A

Table 1

| Search Entity | Top 4 neighbors in KP space | | |
|---|---|---|---|
| | Small | Base | Large |
| Barack Obama | Donald Trump | Bill Clinton | Richard Nixon |
| | George W. Bush | Donald Trump | Donald Trump |
| | Michelle Obama | Ronald Reagan | Michelle Obama |
| | Jimmy Carter | Jimmy Carter | Harrison Ford |
| | George Harrison | David Gilmour | Tom Waits |
| Roger Waters | Pink Floyd | Syd Barrett | Freddie Mercury |
| | Kris Kristofferson | Eddie Vedder | David Gilmour |
| | James Hetfield | Brian Wilson | Cliff Edwards |
| Fairmont station | 500 East station | 700 East station | 700 East station |
| | 300 East station | 300 East station | Historic Gardner station |
| | Sugarmont station | 500 East station | 300 East station |
| | 700 East station | Fairpark station | Decker Lake station |
| Iacobeni , Sibiu | Pălatca | Mica , Cluj | Sic , Cluj |
| | Racovița , Timiș | Gârbău , Cluj | Gârbău , Cluj |
| | Movila , Ialomița | Aiton , Cluj | Mihăileni , Sibiu |
| | Moșna , Sibiu | Rășca , Cluj | Mica , Cluj |

FIG. 7B

Table 2

Simple Questions

| Model | Zero-shot Learning | | Finetuning | |
|---|---|---|---|---|
| | no KPs | KPs | no KPs | KPs |
| T5-SMALL | 0.1 | 4.3 | 32.9 | 54.1 |
| T5-BASE | 0.0 | 8.8 | 35.1 | 58.9 |
| T5-LARGE | 0.0 | 8.8 | 36.6 | 58.3 |

FIG. 7C

Table 3

| Model | Entity Questions | | | | TriviaQA | | | |
|---|---|---|---|---|---|---|---|---|
| | Dev | | Test | | Dev | | Test | |
| | no KPs | KPs | no KP | KPs | no KPs | KPs | no KP | KPs |
| T5-SMALL | 23.3 | 30.6 | 23.6 | 30.8 | 17.4 | 19.4 | 21.4 | 23.8 |
| T5-BASE | 24.5 | 33.3 | 25.4 | 33.1 | 22.7 | 24.9 | 27.1 | 28.1 |
| T5-LARGE | 26.8 | 33.8 | 26.7 | 33.9 | 28.3 | 28.9 | 32.0 | 32.5 |

FIG. 7D
Table 4

| Model | TriviaQA | |
|---|---|---|
| | Dev | Test |
| T5-BASE + KPs | 24.9 | 28.1 |
| T5-LARGE + KPs | 28.9 | 32.5 |
| BERT-base | 28.9 | |
| EaE | 43.2 | 53.4 |
| T5-11B+SSM | 51.0 | 60.5 |
| TOME-2 | 54.6 | 65.8 |

FIG. 7E
Table 5

| Model | FEVER | |
|---|---|---|
| | no KPs | KPs |
| T5-SMALL | 60.2 | 61.4 |
| T5-BASE | 61.3 | 63.4 |
| T5-LARGE | 63.0 | 65.2 |
| EaE | 63.6 | |
| TOME-2 | 68.1 | |

Table 6

| Model | TACRED | |
|---|---|---|
| | no KPs | KPs |
| T5-SMALL | 64.3 | 66.1 |
| T5-BASE | 68.3 | 70.0 |
| T5-LARGE | 69.1 | 69.8 |
| EaE | 70.2 | |
| KnowBERT | 71.5 | |

FIG. 7F

Table 7

| Dataset | KP→Enc | KP→Dec |
|---|---|---|
| Simple Questions | 58.9 | 57.7 |
| Entity Questions | 33.3 | 32.8 |
| TriviaQA | 24.9 | 24.2 |

FIG. 7G

Table 8

| Model | Ent. Linking | KP Search |
|---|---|---|
| T5-SMALL+KPs | 19.4 | 17.9 |
| T5-BASE+KPs | 24.9 | 23.2 |

FIG. 7H

SOFT KNOWLEDGE PROMPTS FOR LANGUAGE MODELS

BACKGROUND

Neural language models (LMs) can be trained to handle certain tasks very effectively, such as providing a relevant answer to a specific question. Large language models (LLMs) can store a significant amount of factual information from pre-training data. The knowledge obtained during pre-training can be utilized in downstream natural language understanding (NLU) tasks such as questions and answers. The larger the LM, the more facts it can memorize at the training time, and the more relevant the results at the inference time.

Despite their success, these models also present some important drawbacks. For example, the parametric memory of such models has a fixed size and cannot grow (or shrink) over time without fully retraining the model. There may be no control in terms of which part of the memory stores data about what. Facts that do not co-occur frequently in the training data would not be well represented in the model. Very large models may be required to memorize enough data in order to perform satisfactorily on knowledge intensive tasks such as generative question answering. In addition, the memorized knowledge can become obsolete over time, which would require re-training the model for "refreshness" to avoid obsolescence.

BRIEF SUMMARY

The technology relates to the use of soft knowledge prompts to inject relevant world knowledge into LMs. Aspects of the technology provide a method and arrangement to train soft prompts via self-supervised learning on data from one or more knowledge bases. The resulting soft knowledge prompts (hereinafter, KPs) are task independent and can effectively function as an external memory of the LMs. Qualitative and quantitative experiments demonstrate that KPs can effectively model the structure of the training data, and that they can be used to improve the performance of LMs in different knowledge intensive tasks. Such tasks may include generative question/answer tasks, chat applications, suggesting text to complete a sentence or thought, etc.

According to one aspect, a computer-implemented method is provided that comprises: identifying, by one or more processors of a computing system, a soft knowledge prompt in response to a received input text; concatenating, by the one or more processors, the identified soft knowledge prompt to a sequence of word embeddings of the input text; applying, by the one or more processors, the concatenated soft knowledge prompt and the sequence of word embeddings to a trained language model; predicting, by the one or more processors, an object entity name; computing, by the one or more processors, a cross-entropy loss; and updating the identified soft knowledge prompt based on the computed cross-entropy loss.

In one example, the method may further comprise: selecting the updated soft knowledge prompt in response to a received query; applying the selected soft knowledge prompt to the trained model; and transmitting a response to the received query. Alternatively or additionally, the trained language model is frozen prior to applying the concatenated soft knowledge prompt. Alternatively or additionally, the soft knowledge prompt may be stored in external memory separate from the trained language model. Here, the external memory may be of variable size and a memory size of the trained language model is fixed.

Applying the concatenated soft knowledge prompt and the sequence of word embeddings to the trained language model may be done as an input to an encoder of the trained language model. Or applying the concatenated soft knowledge prompt and the sequence of word embeddings to the trained language model may be done as an input to a decoder of the trained language model.

Alternatively or additionally to any of the above, updating the identified soft knowledge prompt may be done by back-propagating the computed cross-entropy loss through the trained language model. Alternatively or additionally to any of the above, the cross-entropy loss may be computed by applying max pooling and projection to vectors output by an encoder of the trained language model.

According to another aspect, a computer-implemented method is provided that comprises: identifying, by one or more processors of a computing system, a soft knowledge prompt in response to a received query, the soft knowledge prompt being stored in memory external to a trained language model; adding, by the one or more processors, the identified soft knowledge prompt to information associated with word embeddings of the received query to form a set of combined information; applying, by the one or more processors, the set of combined information to the trained language model; predicting, by the one or more processors, an object entity name; and transmitting a response to the received query according to the predicted entity name.

In one example, the soft knowledge prompt is identified by an entity linker, and the method includes applying the identification by the entity linker to the memory to retrieve the soft knowledge prompt. Applying the set of combined information to the trained language model may be done as an input to an encoder of the trained language model. Or applying the set of combined information to the trained language model may be done as an input to a decoder of the trained language model.

According to a further aspect, a computing system is provided comprising memory configured to store a set of soft knowledge prompts, and one or more processors operatively coupled to the memory. The one or more processors are configured to: identify a soft knowledge prompt in response to a received input text; concatenate the identified soft knowledge prompt to a sequence of word embeddings of the input text; apply the concatenated soft knowledge prompt and the sequence of word embeddings to a trained language model; predict an object entity name; compute a cross-entropy loss; and update, in the memory, the identified soft knowledge prompt based on the computed cross-entropy loss. Application of the concatenated soft knowledge prompt and the sequence of word embeddings to the trained language model may be done as an input to an encoder of the trained language model. Or application of the concatenated soft knowledge prompt and the sequence of word embeddings to the trained language model may be done as an input to a decoder of the trained language model. The update of the identified soft knowledge prompt may be done by back-propagating the computed cross-entropy loss through the trained language model. And the cross-entropy loss may be computed by applying max pooling and projection to vectors output by an encoder of the trained language model.

According to yet another aspect, a computing system is provided comprising memory configured to store a set of soft knowledge prompts and one or more processors operatively coupled to the memory. The one or more processors are configured to: identify a soft knowledge prompt in response to a received query, the soft knowledge prompt being stored in the memory that is external to a trained language model; add the identified soft knowledge prompt to information associated with word embeddings of the received query to form a set of combined information; apply the set of combined information to the trained language model; predict an object entity name; and transmit a response to the received query according to the predicted entity name. Application of the set of combined information to the trained language model may be done as an input to an encoder of the trained language model. Or application of the set of combined information to the trained language model may be done as an input to a decoder of the trained language model.

BRIEF DESCRIPTION OF THE DRAWINGS

FIGS. 4D-E illustrate examples of knowledge prompt retrieval and entity linking in accordance with aspects of the technology.

FIG. 5 illustrates an example of knowledge prompt retrieval in accordance with aspects of the technology.

FIGS. 7A-H illustrate tables of test results in accordance with aspects of the technology.

DETAILED DESCRIPTION

Soft knowledge prompts (KPs) are used during the training of "frozen" LMs. A goal is to train an external memory that is composed of a large set of soft prompts that encode world knowledge. As discussed herein, a method is employed to train knowledge-driven soft prompts via self-supervised learning on data from one or more knowledge bases. The resulting KPs, function as an auxiliary memory of the LMs that is activated when solving knowledge-intensive tasks. This is different from other possible applications of soft prompts that concatenate a fixed small set of embeddings to every input. For instance, the instant approach learns a very large set of KPs, which are sparsely activated depending on the input.

One aspect of the technology focuses on entity-centric KPs, which means that each prompt primarily encodes information about one entity from a given knowledge base. In one scenario, Wikidata triples may be used as the training data, and the processes here can involve train KPs for the top X entities (e.g., a large set of entities such as over 1 million entities), based on the number of triples. A qualitative analysis of KPs has been performed using t-SNE plots and k-nearest neighbor approaches. In terms of quantitative analysis, experimental results have been obtained for three knowledge intensive tasks: question answering, fact checking and relation classification. For all datasets, the use of KPs can be shown to improve the performance of the T5 baseline. Such results demonstrate that KPs are an effective way to expand the memory of frozen LMs.

Example Systems and Methods

Figure 1:
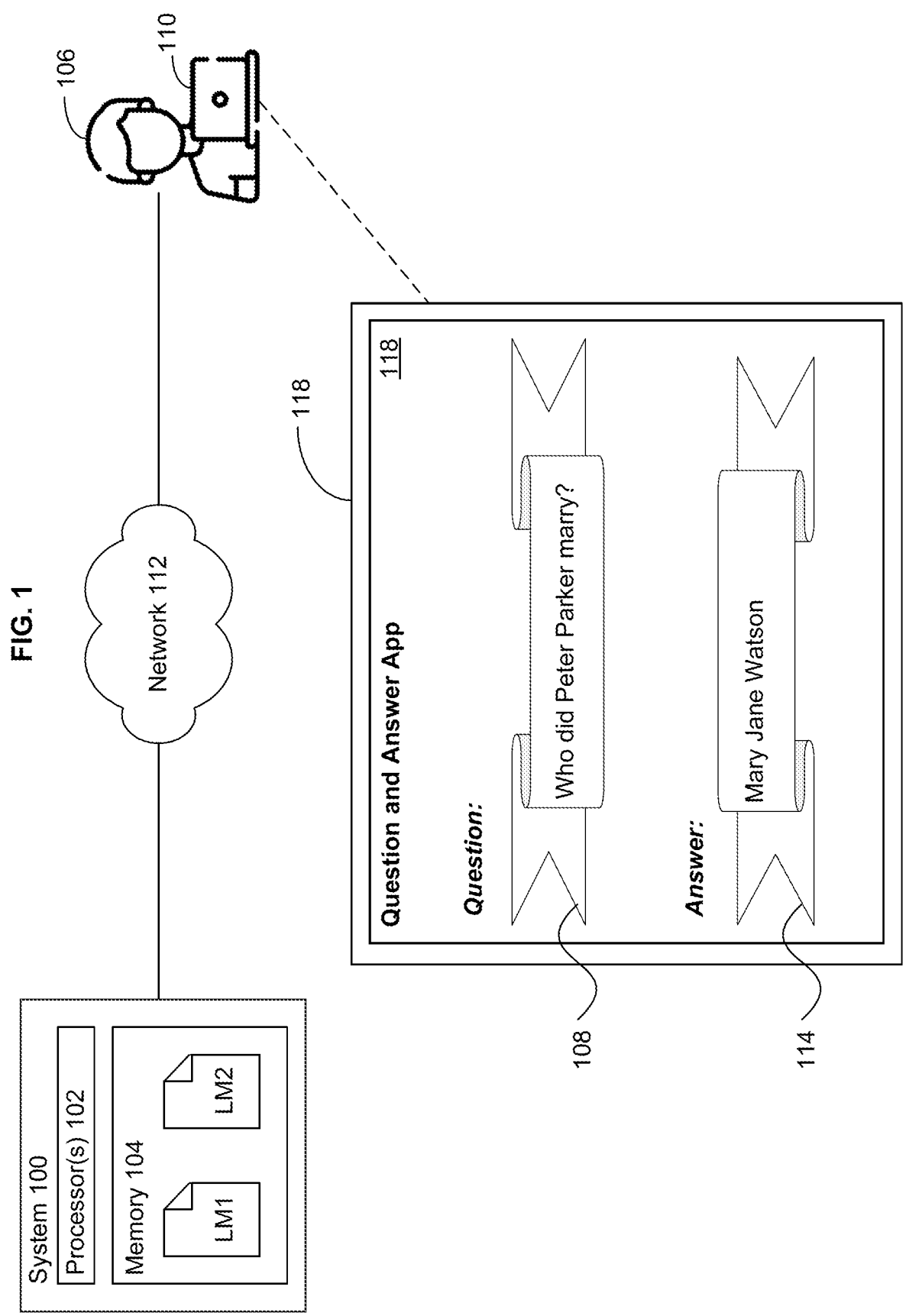
FIG. 1 illustrates an example system for use in accordance with aspects of the technology.

The present technology will now be described with respect to the following exemplary systems and methods. FIG. 1 illustrates a system 100 for handing queries, such as via a question and answer app. The system 100 may include one or more processors 102 and memory 104 for storing data. In one example, the memory 104 may store a set of language models, shown here as including first (LM1) and second (LM2) models. A user 106 can formulate a query 108 on their client device 110, which may be, e.g., a laptop or desktop computer, a tablet PC, a mobile phone or PDA, a smartwatch, a smart home appliance, etc.

The query 108 is sent to the system 100 via a network 112. Once the system applies a selected language model (LM) to the query 108, it returns an answer 114 via the network 112. The question may be posed and the answer presented via an app 116 displayable to the user 106 on a graphical user interface (GUI) 118 of the user's client device 110.

Different approaches have been proposed to train soft prompts. For example, one approach does the following: (1) for a task in the dataset, prepend a fixed number of embeddings (soft prompts) to the word embeddings of every input, and (2) during training, update the soft prompt while keeping all the other parameters of the frozen LM.

However, aspects of the technology discussed herein involve training soft knowledge prompts (KPs) to encode world knowledge, which may work as an external memory for LMs. Thus, one aspect focuses on the training of entity-centric KPs, each of which stores the knowledge related to a specific entity from a knowledge base (KB). In other words, the KP of an entity encodes information from the KB triples that mention the entity either as a subject or an object. The triples are of the form (subject, relation, object). Thus, in the example of FIG. 1, the subject may be Peter Parker, the relation is spouse (or wife), and the object would be Mary Jane Watson.

According to one scenario, an encoder-decoder LM may be employed, which may use a Transformer-type architecture. According to another scenario, an encoder-only LM may be utilized.

Figure 2:
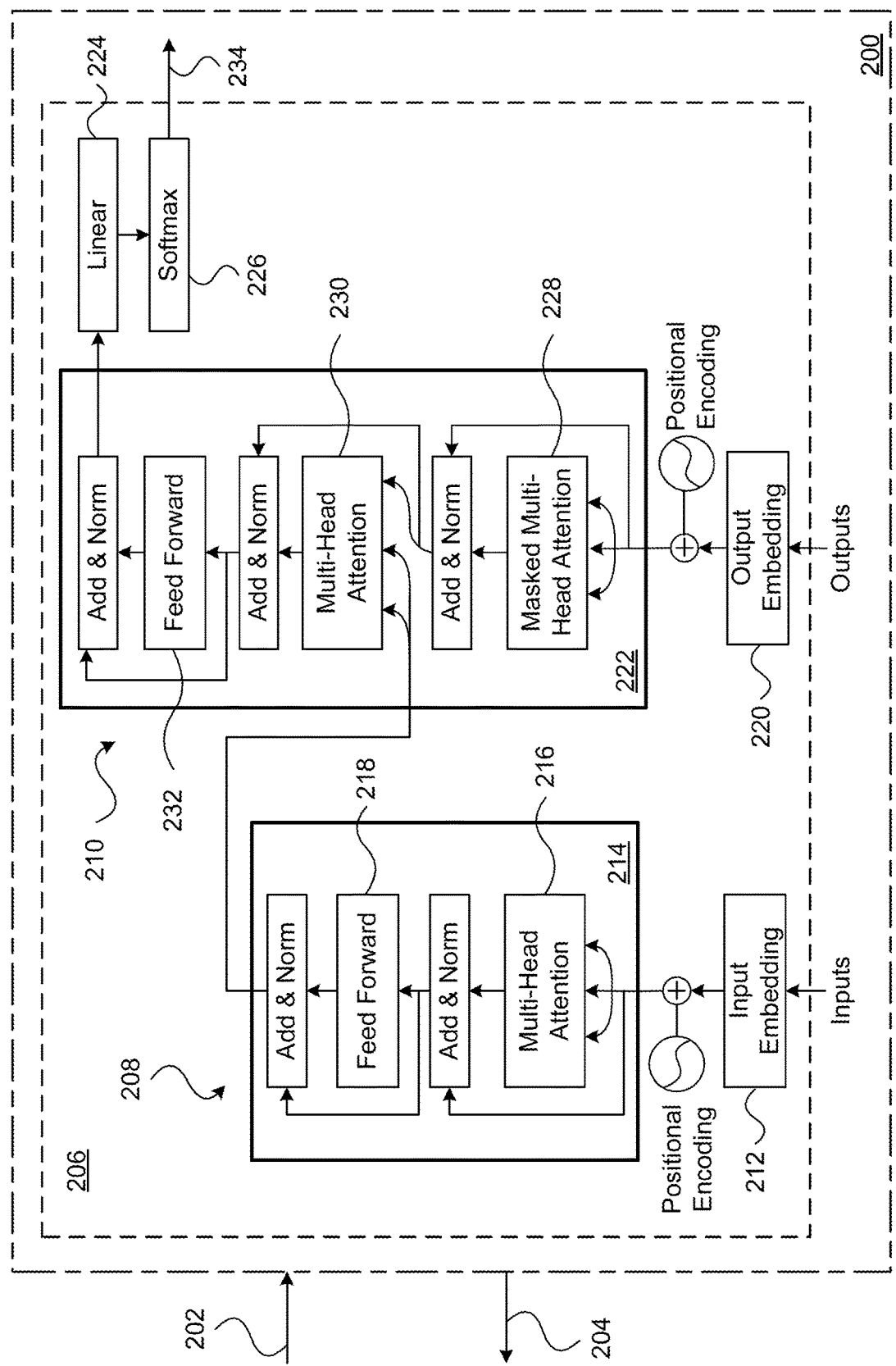
FIG. 2 illustrates a Transformer-type architecture for use in accordance with aspects of the technology.

By way of example only, a suitable Transformer architecture is presented in FIG. 2. In particular, system 200 of FIG. 2 is implementable via a computer program by processors of one or more computers in one or more locations. The system 200 receives an input sequence 202 (e.g., a query) and processes the input sequence 202 to transduce the input sequence 202 into an output sequence 204 (e.g., an answer). The input sequence 202 has a respective network input at each of multiple input positions in an input order and the output sequence 204 has a respective network output at each of multiple output positions in an output order.

System 200 can perform any of a variety of tasks that require processing sequential inputs to generate sequential outputs. System 200 includes an attention-based sequence transduction neural network 206, which in turn includes an encoder neural network 208 and a decoder neural network 210. The encoder neural network 208 is configured to receive the input sequence 202 and generate a respective encoded representation of each of the network inputs in the input sequence. An encoded representation is a vector or other ordered collection of numeric values. The decoder neural network 210 is then configured to use the encoded representations of the network inputs to generate the output sequence 204. Generally, both the encoder 208 and the decoder 210 are attention-based. In some cases, neither the encoder nor the decoder includes any convolutional layers or any recurrent layers. The encoder neural network 208 includes an embedding layer (input embedding) 212 and a sequence of one or more encoder subnetworks 214. The encoder neural 208 network may N encoder subnetworks 214.

The embedding layer 212 is configured, for each network input in the input sequence, to map the network input to a numeric representation of the network input in an embedding space, e.g., into a vector in the embedding space. The embedding layer 212 then provides the numeric representations of the network inputs to the first subnetwork in the sequence of encoder subnetworks 214. The embedding layer 212 may be configured to map each network input to an embedded representation of the network input and then combine, e.g., sum or average, the embedded representation of the network input with a positional embedding of the input position of the network input in the input order to generate a combined embedded representation of the network input. In some cases, the positional embeddings are learned. As used herein, "learned" means that an operation or a value has been adjusted during the training of the sequence transduction neural network 206. In other cases, the positional embeddings may be fixed and are different for each position.

The combined embedded representation is then used as the numeric representation of the network input. Each of the encoder subnetworks 214 is configured to receive a respective encoder subnetwork input for each of the plurality of input positions and to generate a respective subnetwork output for each of the plurality of input positions. The encoder subnetwork outputs generated by the last encoder subnetwork in the sequence are then used as the encoded representations of the network inputs. For the first encoder subnetwork in the sequence, the encoder subnetwork input is the numeric representations generated by the embedding layer 212, and, for each encoder subnetwork other than the first encoder subnetwork in the sequence, the encoder subnetwork input is the encoder subnetwork output of the preceding encoder subnetwork in the sequence.

Each encoder subnetwork 214 includes an encoder self-attention sub-layer 216. The encoder self-attention sub-layer 216 is configured to receive the subnetwork input for each of the plurality of input positions and, for each particular input position in the input order, apply an attention mechanism over the encoder subnetwork inputs at the input positions using one or more queries derived from the encoder subnetwork input at the particular input position to generate a respective output for the particular input position. In some cases, the attention mechanism is a multi-head attention mechanism as shown. In some implementations, each of the encoder subnetworks 214 may also include a residual connection layer that combines the outputs of the encoder self-attention sub-layer with the inputs to the encoder self-attention sub-layer to generate an encoder self-attention residual output and a layer normalization layer that applies layer normalization to the encoder self-attention residual output. These two layers are collectively referred to as an "Add & Norm" operation in FIG. 2.

Some or all of the encoder subnetworks can also include a position-wise feed-forward layer 218 that is configured to operate on each position in the input sequence separately. In particular, for each input position, the feed-forward layer 218 is configured receive an input at the input position and apply a sequence of transformations to the input at the input position to generate an output for the input position. The inputs received by the position-wise feed-forward layer 218 can be the outputs of the layer normalization layer when the residual and layer normalization layers are included or the outputs of the encoder self-attention sub-layer 216 when the residual and layer normalization layers are not included. The transformations applied by the layer 218 will generally be the same for each input position (but different feed-forward layers in different subnetworks may apply different transformations).

In cases where an encoder subnetwork 214 includes a position-wise feed-forward layer 218 as shown, the encoder subnetwork can also include a residual connection layer that combines the outputs of the position-wise feed-forward layer with the inputs to the position-wise feed-forward layer to generate an encoder position-wise residual output and a layer normalization layer that applies layer normalization to the encoder position-wise residual output. As noted above, these two layers are also collectively referred to as an "Add & Norm" operation. The outputs of this layer normalization layer can then be used as the outputs of the encoder subnetwork 214.

Once the encoder neural network 208 has generated the encoded representations, the decoder neural network 210 is configured to generate the output sequence in an auto-regressive manner. That is, the decoder neural network 210 generates the output sequence, by at each of a plurality of generation time steps, generating a network output for a corresponding output position conditioned on (i) the encoded representations and (ii) network outputs at output positions preceding the output position in the output order. In particular, for a given output position, the decoder neural network generates an output that defines a probability distribution over possible network outputs at the given output position. The decoder neural network can then select a network output for the output position by sampling from the probability distribution or by selecting the network output with the highest probability.

Because the decoder neural network 210 is auto-regressive, at each generation time step, the decoder network 210 operates on the network outputs that have already been generated before the generation time step, i.e., the network outputs at output positions preceding the corresponding output position in the output order. In some implementations, to ensure this is the case during both inference and training, at each generation time step the decoder neural network 210 shifts the already generated network outputs right by one output order position (i.e., introduces a one position offset into the already generated network output sequence) and (as will be described in more detail below) masks certain operations so that positions can only attend to positions up to and including that position in the output sequence (and not subsequent positions). While the remainder of the description below describes that, when generating a given output at a given output position, various components of the decoder 210 operate on data at output positions preceding the given output positions (and not on data at any other output positions), it will be understood that this type of conditioning can be effectively implemented using shifting.

The decoder neural network 210 includes an embedding layer (output embedding) 220, a sequence of decoder subnetworks 222, a linear layer 224, and a softmax layer 226. In particular, the decoder neural network can include N decoder subnetworks 222. However, while the example of FIG. 2 shows the encoder 208 and the decoder 210 including the same number of subnetworks, in some cases the encoder 208 and the decoder 210 include different numbers of subnetworks. The embedding layer 220 is configured to, at each generation time step, for each network output at an output position that precedes the current output position in the output order, map the network output to a numeric representation of the network output in the embedding space. The embedding layer 220 then provides the numeric representations of the network outputs to the first subnetwork 222 in the sequence of decoder subnetworks.

In some implementations, the embedding layer 220 is configured to map each network output to an embedded representation of the network output and combine the embedded representation of the network output with a positional embedding of the output position of the network output in the output order to generate a combined embedded representation of the network output. The combined embedded representation is then used as the numeric representation of the network output. The embedding layer 220 generates the combined embedded representation in the same manner as described above with reference to the embedding layer 212.

Each decoder subnetwork 222 is configured to, at each generation time step, receive a respective decoder subnetwork input for each of the plurality of output positions preceding the corresponding output position and to generate a respective decoder subnetwork output for each of the plurality of output positions preceding the corresponding output position (or equivalently, when the output sequence has been shifted right, each network output at a position up to and including the current output position). In particular, each decoder subnetwork 222 includes two different attention sub-layers: a decoder self-attention sub-layer 228 and an encoder-decoder attention sub-layer 230. Each decoder self-attention sub-layer 228 is configured to, at each generation time step, receive an input for each output position preceding the corresponding output position and, for each of the particular output positions, apply an attention mechanism over the inputs at the output positions preceding the corresponding position using one or more queries derived from the input at the particular output position to generate a updated representation for the particular output position. That is, the decoder self-attention sub-layer 228 applies an attention mechanism that is masked so that it does not attend over or otherwise process any data that is not at a position preceding the current output position in the output sequence.

Each encoder-decoder attention sub-layer 230, on the other hand, is configured to, at each generation time step, receive an input for each output position preceding the corresponding output position and, for each of the output positions, apply an attention mechanism over the encoded representations at the input positions using one or more queries derived from the input for the output position to generate an updated representation for the output position. Thus, the encoder-decoder attention sub-layer 230 applies attention over encoded representations while the decoder self-attention sub-layer 228 applies attention over inputs at output positions.

In the example of FIG. 2, the decoder self-attention sub-layer 228 is shown as being before the encoder-decoder attention sub-layer in the processing order within the decoder subnetwork 222. In other examples, however, the decoder self-attention sub-layer 228 may be after the encoder-decoder attention sub-layer 230 in the processing order within the decoder subnetwork 222 or different subnetworks may have different processing orders. In some implementations, each decoder subnetwork 222 includes, after the decoder self-attention sub-layer 228, after the encoder-decoder attention sub-layer 230, or after each of the two sub-layers, a residual connection layer that combines the outputs of the attention sub-layer with the inputs to the attention sub-layer to generate a residual output and a layer normalization layer that applies layer normalization to the residual output. These two layers being inserted after each of the two sub-layers, both referred to as an "Add & Norm" operation.

Some or all of the decoder subnetwork 222 also include a position-wise feed-forward layer 232 that is configured to operate in a similar manner as the position-wise feed-forward layer 218 from the encoder 208. In particular, the layer 232 is configured to, at each generation time step: for each output position preceding the corresponding output position: receive an input at the output position, and apply a sequence of transformations to the input at the output position to generate an output for the output position. The inputs received by the position-wise feed-forward layer 232 can be the outputs of the layer normalization layer (following the last attention sub-layer in the subnetwork 222) when the residual and layer normalization layers are included or the outputs of the last attention sub-layer in the subnetwork 222 when the residual and layer normalization layers are not included. In cases where a decoder subnetwork 222 includes a position-wise feed-forward layer 232, the decoder subnetwork can also include a residual connection layer that combines the outputs of the position-wise feed-forward layer with the inputs to the position-wise feed-forward layer to generate a decoder position-wise residual output and a layer normalization layer that applies layer normalization to the decoder position-wise residual output. These two layers are also collectively referred to as an "Add & Norm" operation. The outputs of this layer normalization layer can then be used as the outputs of the decoder subnetwork 222.

At each generation time step, the linear layer 224 applies a learned linear transformation to the output of the last decoder subnetwork 222 in order to project the output of the last decoder subnetwork 222 into the appropriate space for processing by the softmax layer 226. The softmax layer 226 then applies a softmax function over the outputs of the linear layer 224 to generate the probability distribution (output probabilities) 234 over the possible network outputs at the generation time step. The decoder 210 can then select a network output from the possible network outputs using the probability distribution, to output final result 204.

External Memory for Language Models

Figure 3:
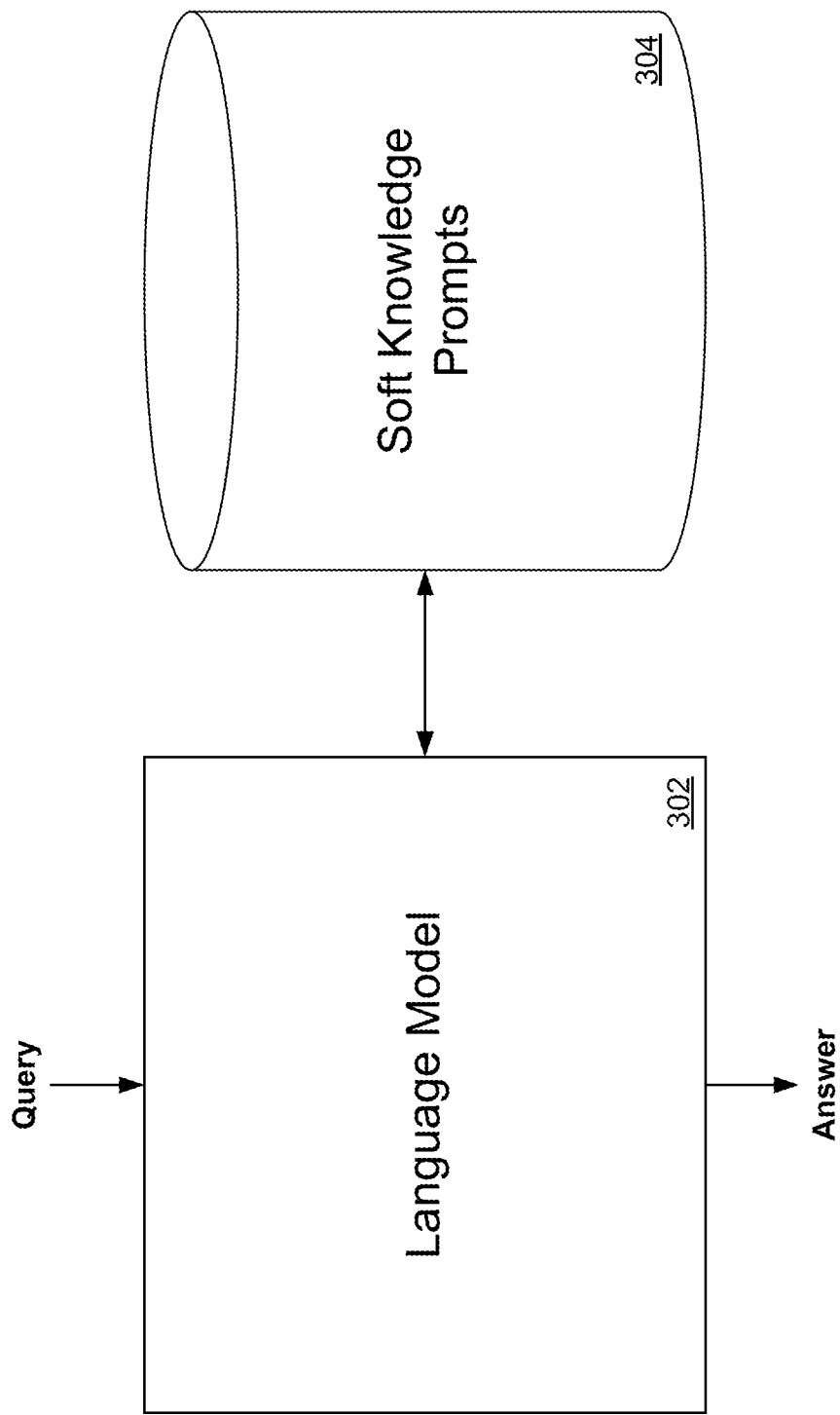
FIG. 3 illustrates an external memory approach for language models in accordance with aspects of the technology.

As noted above, the approach may train a memory external to the language model, in which the external memory contains soft knowledge prompts that are used to enhance the world knowledge of the language model. FIG. 3 illustrates a functional arrangement 300, in which there is a language model 302 and an external memory 304. The external memory 304 can maintain a large set of soft prompts that encode world knowledge. In response to a query, the external memory is triggered to supply one or more knowledge prompts to the language model. The language model, which was previously trained, uses the knowledge prompt(s) to effectively expand its own memory and provide a corresponding answer to the query.

There are several technical advantages to this approach. For instance, the external memory 304 may be sparse, as only a fraction of it needs to be used for an input. Thus, the trained language model can employ a small encoder-decoder with a very large sparse external memory. The external memory space can grow or shrink over time as warranted. And in some instances, trusted knowledge bases can be used to train soft knowledge prompts and potentially improve factuality.

In many instances, it would be unfeasible to retrain the language model. Thus, the soft knowledge prompts are a way to achieve the desired result while the language model can be "frozen".

Knowledge Prompt Training

Figure 4A:
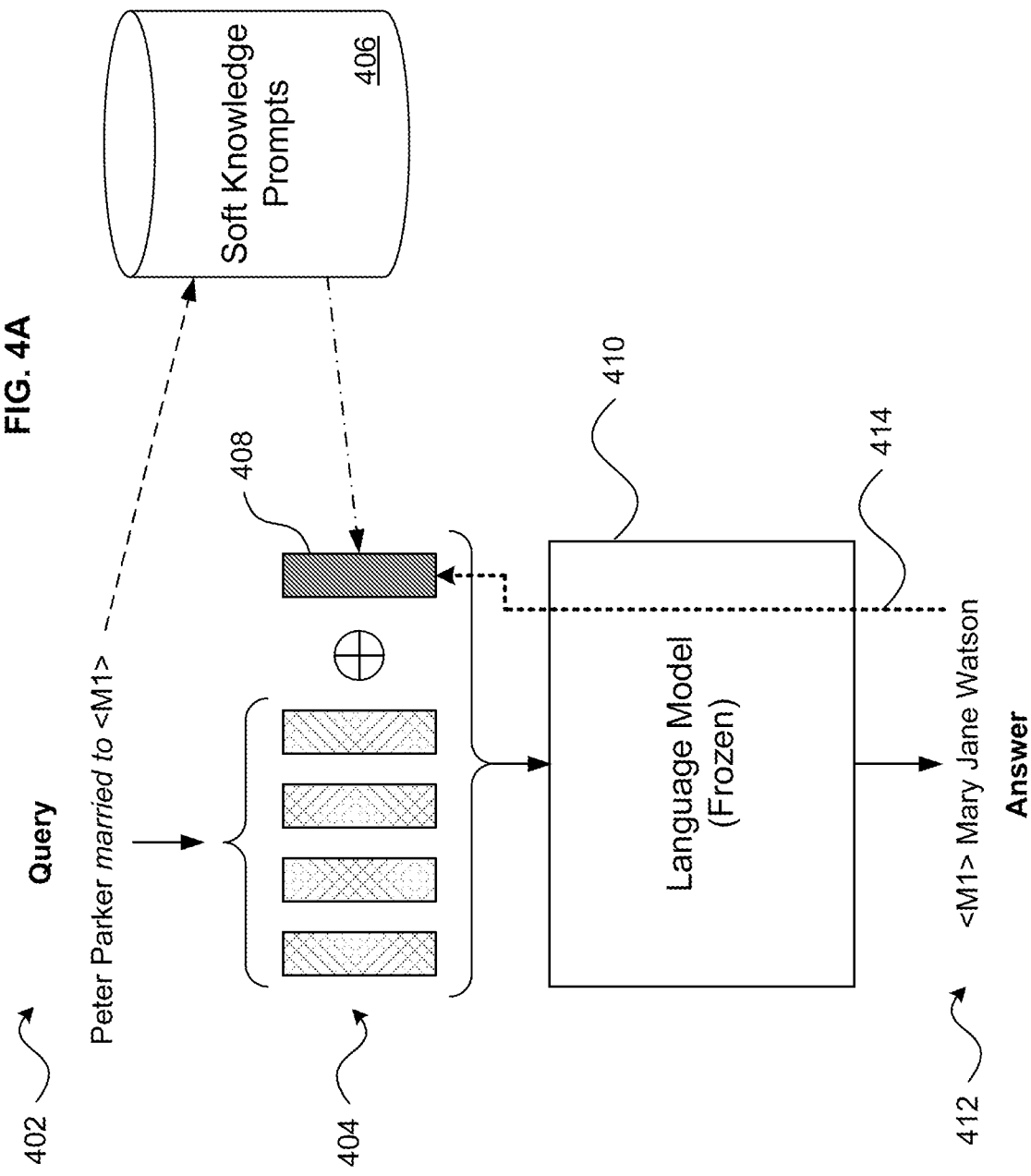
FIGS. 4A-C illustrate examples of knowledge prompt training in accordance with aspects of the technology.

As discussed above, entity-centric KPs are trained so that each one stores the knowledge related to a specific entity. FIG. 4A illustrates an approach 400 for training knowledge prompts. The illustrated approach in this example is general, and can be used with any textual input as long as the entities of interest are already identified/linked.

The KPs in this scenario are trained with a masked language modeling (MLM) objective, where the goal is to generate the object entity of a KB triple given the subject entity and relation, and vice versa. As an example, the input/target pair "Germany capital <MASK>"/"Berlin" will be used to update the KP for Germany, while the pair "<MASK> capital Berlin"/"Germany" will be used to update the KP for Berlin.

The entity embedding matrix for the set of soft knowledge prompts can be very large (e.g., billions of entries) and using all of them as inputs to the encoder or decoder may be impractical. Therefore, according to one aspect of the technology an efficient way to rank KPs based on their importance to the input text involves training a KP such that it summarizes the information in the input text that is important to retrieve relevant KPs. This is done via back-propagation according to a contrastive loss function.

In the example of FIG. 4A, query 402 the input/target pair is Peter Parker+ and married, while the mask is <M1>. This information is applied as a set of word embeddings 404, and is sent to a separate database 406 of soft knowledge prompts (as shown by the dashed arrow). A relevant entity (soft) knowledge prompt 408 is retrieved from the database 406 and concatenated or otherwise added to the set of word embeddings. This information is collectively input to (frozen) language model 410. The language model 410 evaluates the input information based on its prior training, where the relevant entity KP 408 augments the word embeddings to arrive at answer 412 (here, Mary Jane Watson). As shown by dotted arrow 414, error or loss information can be back-propagated through the language model 410 in order to update the relevant entity KP 408. The corresponding soft knowledge prompt in the database 406 can then be updated accordingly.

According to one aspect of knowledge prompt training, the KPs may be randomly initialized. In this case, they may be updated only when the corresponding entities appear (not masked) in the input. This makes the training of KPs sparse and parallelizable. Given an input triple with the object entity being masked, a training iteration may involve the following steps. First, convert the input text (triple) into word embeddings and retrieve the KP of the subject entity, e.g., according to a lookup operation. Then concatenate the KP to the sequence of word embeddings of the input text. Next, predict the object entity name and compute the cross-entropy loss or error. Then back-propagate the loss (error) through the frozen LM to the KP, and update the KP using stochastic gradient descent or another suitable back-propagation technique.

As noted above, FIG. 4A shows a generalized approach. Depending on the language model architecture, the implementation may vary. For instance, the use of an encoder-decoder language mode gives the flexibility to introduce KPs at either encoder or decoder. For instance, FIG. 4B illustrates an example 420 with an encoder-decoder architecture in which the KPs are introduced as inputs to the encoder, while FIG. 4C illustrates another example 440 in which the KPs are introduced as inputs to the decoder.

Figure 4B:
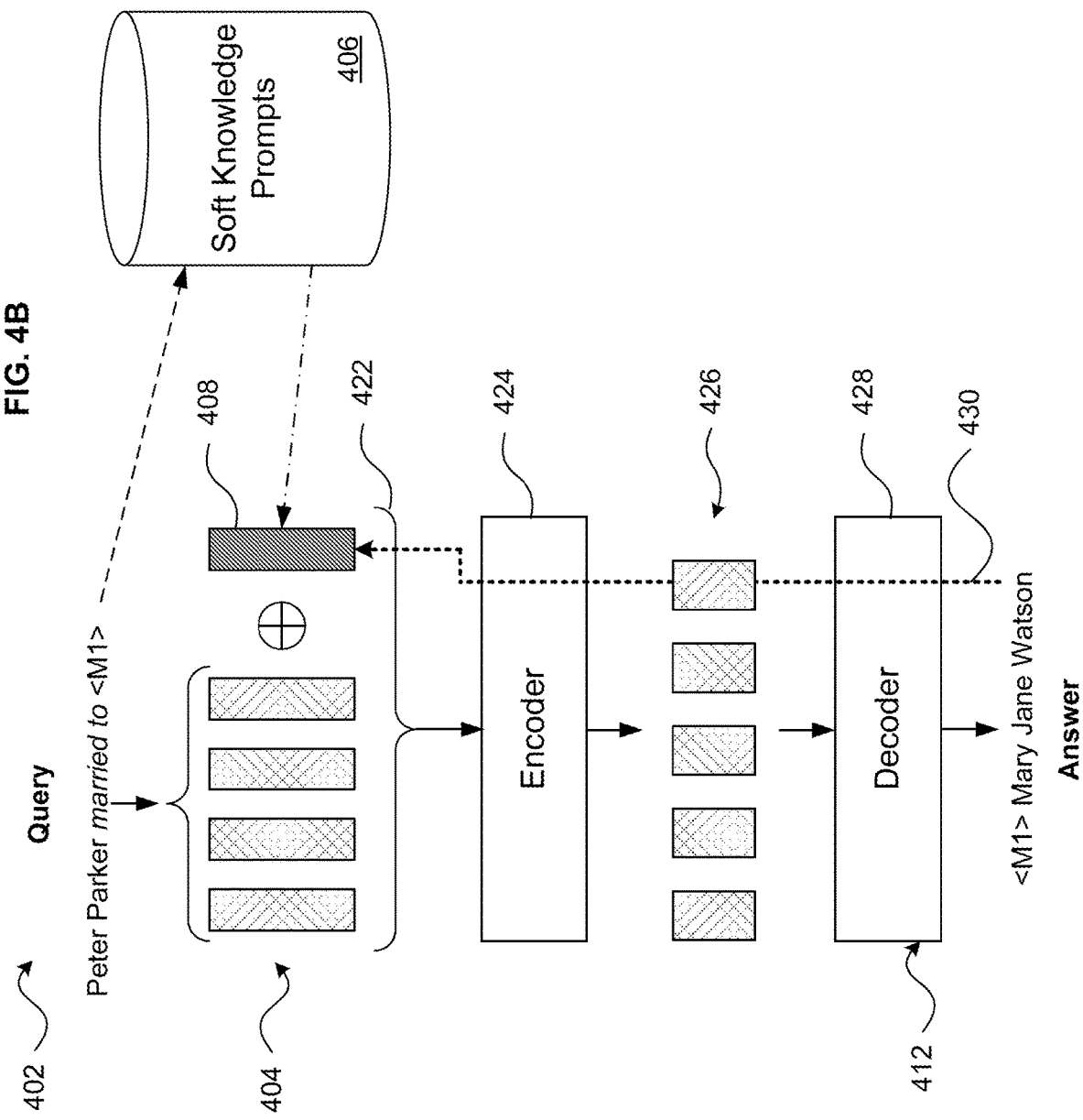
Figure 4C:
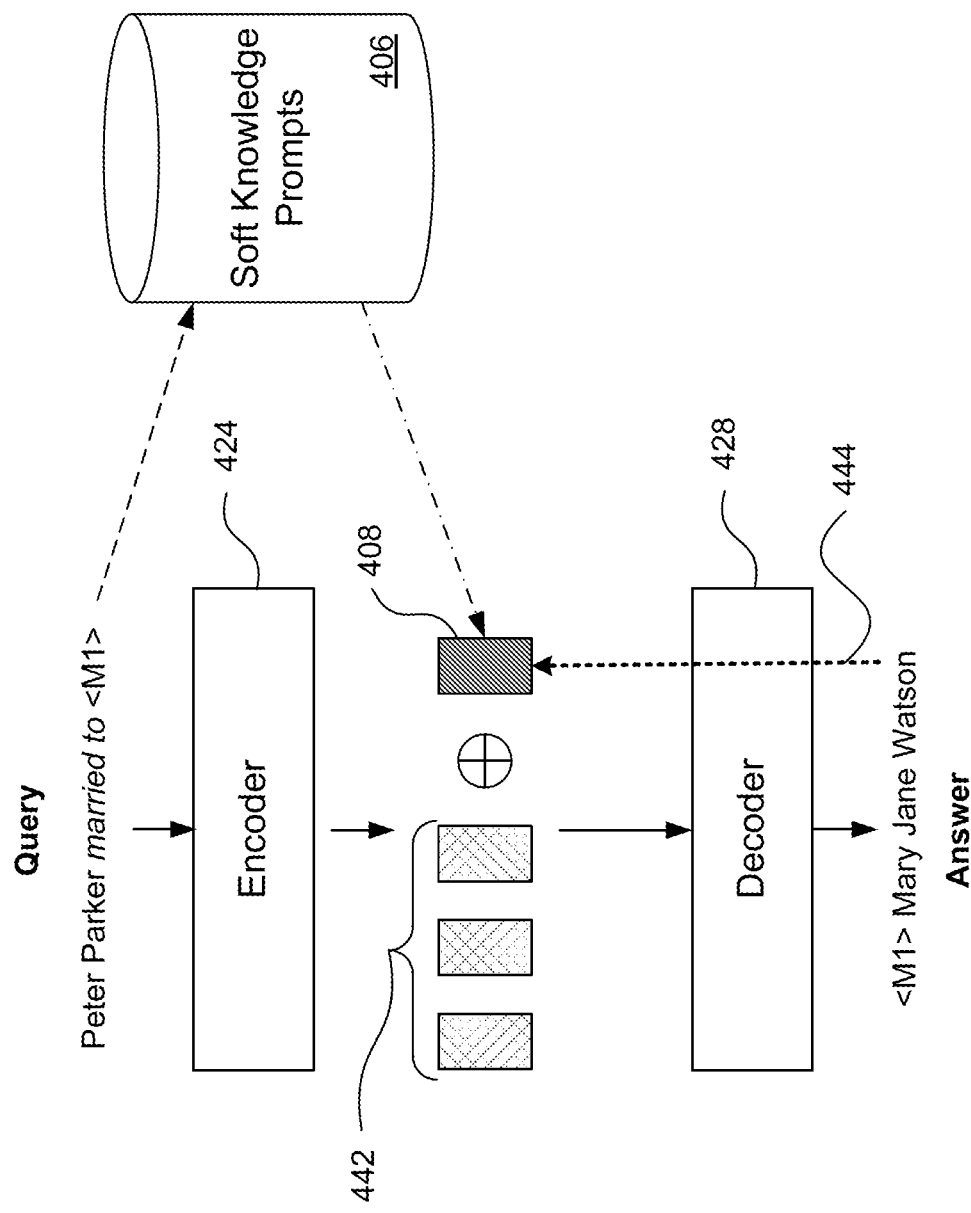

As shown in FIG. 4B, KP 408 is concatenated to the word embeddings 404, and then this set of information 422 is input to encoder 424. The encoder outputs 426 are processed by decoder 428. Here, back-propagation through the decoder 428 and encoder 424 is shown by the dashed arrow 430. In contrast, as shown in FIG. 4C, KP 408 is concatenated to the output 442 of the encoder 424, and that information is processed by the decoder 428 to generate the answer. In this case, back-propagation through the decoder 428 is shown by the dashed arrow 444. This latter approach makes KPs accessible only by the decoder via cross-attention. Experimental results for these different approaches are presented below.

Using Soft Knowledge Prompts in Downstream Tasks

Using KPs during the finetuning of the LM can be done as follows. Given the input sequence, e.g., a question, the relevant KPs are retrieved and concatenated to the word embeddings of the input, to generate or predict the answer. At the model finetuning stage, the KPs can be frozen and only the parameters of the LM may be updated, as the KPs are used as pre-trained external knowledge. This can be helpful when using relatively small LMs. Alternatively or additionally, one could also use task-specific soft prompts instead of finetuning the parameters of the LM.

Retrieving KPs that are relevant to the input sequence is important for good performance in the downstream task. KPs are most useful when they contain the knowledge that is helpful to solve the input at hand. Entity linking can be employed (e.g., based on input text) as a way to retrieve relevant KPs during training/inference for downstream tasks. Given an input, entity linking is first performed to identify the entities mentioned in the input. Then, a lookup operation can be done to retrieve the KPs of the identified entities.

Figure 4D:
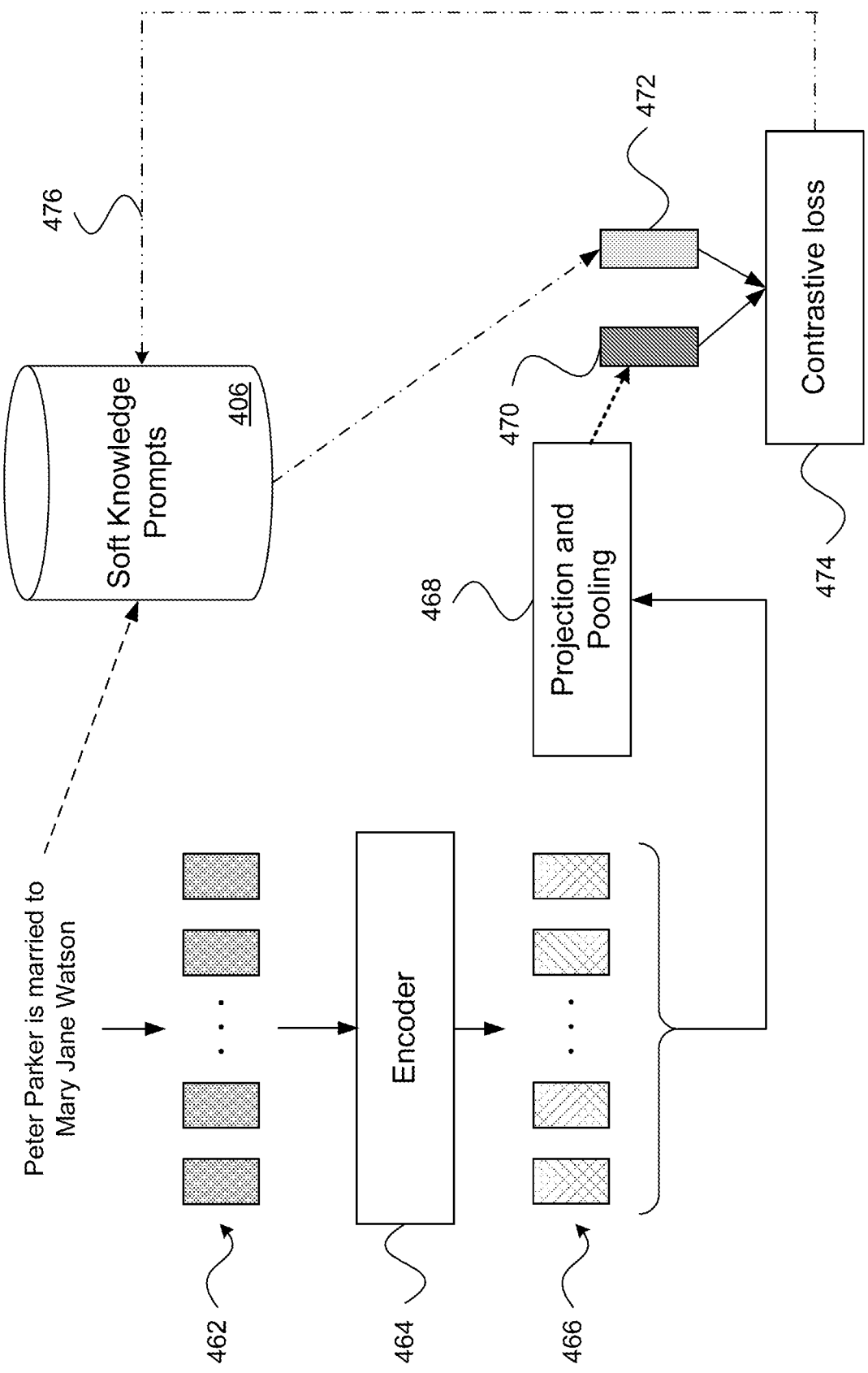

FIG. 4D illustrates an example 460 for learning to retrieve KPs. Here, word embeddings 462 are input to an encoder 464. The vectors 466 output by the encoder 464 is used to produce a single vector that is used to query the KPs database (here, KP memory 406). The single vector is generated by first applying max pooling over the vectors output by the encoder, then multiplying the resulting vector by a learned matrix of parameters (the projection). Both are shown occurring at block 468. Next, the cosine similarity is computed between the projected vector (search vector) 470 and the KPs 472 in the memory, as shown by contrastive loss block 474. The system can then retrieve the top-k KPs form the memory 406 that are closest to the search vector 470, as shown by arrow 476.

This approach can be used when injecting KPs into the decoder, because the output of the encoder is used in order to create the search vector. An alternative is to train a separate encoder network for the task of creating the search vector. Here, when using a separate encoder to generate the search vector, the system can use the retrieved KPs as input to the LM's encoder.

FIG. 4E illustrates an example 480 in which an entity linker 482 is used to help identify relevant KPs from the memory 406. Here, the query is provided to both the entity linker 482 and to the encoder 484. The goal in entity linking is to identify and disambiguate named entities that appear in the input text. Based on the context, the entity linker should be able to distinguish between Peter Parker the photographer and Peter Parker the machine learning researcher. The information about what entities appear in the text (which is the output of entity linker) is used to look up the KPs of those entities from the KP dataset. As shown in this example, the result 488 from the dataset is incorporated (e.g., concatenated) with the vectors 486 output by the encoder 484. This information is input to the decoder 490, which outputs information regarding the answer (e.g., Mary Jane Watson, answering the question "who is Peter Parker married to?").

FIG. 5 illustrates an example 500 of the approach of retrieving KPs with a search vector/prompt. Here, given the input text 502, it is converted into word embeddings 504. The word embeddings 504 are concatenated with an entity search prompt 506, and given as input to encoder 508. The encoder 508 generates a set of outputs 510 for processing by the decoder 512. A contextualized entity search prompt 514 may be separately generated by the encoder 508, which is sent to KP database 516. Alternatively, the contextualized search prompt 514 may be derived from the entity linking approach discussed above regarding FIG. 4E, instead of being generated by the encoder 508. The contextualized entity search prompt 514 is used to rank entity KPs. By way of example, the score for each KP may be the result of the dot product between the prompt 514 and that KP. Then, the system selects the top k entity soft knowledge prompts 518, concatenates them to the output of the encoder at 520, and provides this as input to decoder 522. Here, the decoder 522 decodes the task output 524 and computes the cross-entropy loss. The decoder can then be updated using back-propagation and gradient descent. Note that in this example, the encoder 508, KPs, and the entity prompt search 506 are frozen during finetuning for downstream tasks.

According to an aspect of the technology, the system keeps the LM frozen during the learning of KPs, which guarantees (i) that one can always use the same LM again to add new embeddings to the KP matrix (allowing the external memory to grow), (ii) there is no adverse impact on the LM's ability to produce good text and "understand" language, and (iii) the system can continually update the external memory as new data/facts about entities arrive.

Note that KPs can be given as input to the decoder in order to avoid an $n^2$ self-attention complexity that can occur when giving them as input to the encoder. Thus, for tasks such as question answering, the decoder input approach may be more suitable as the system may evaluate a very large number of KPs at the same time. Because KPs are used in the decoder via cross-attention, this supports the use of a large number of KPs.

Experimental Setup

The following provides a discussion regarding an experimental setup and testing of the technology described herein.

Wikidata triples were adopted as the source of data to train KPs. The setup started with a set of 45M pre-processed triples that was previously preprocessed. Next, triples were filtered out whose subject entity appears less than 12 times as subject entity in the dataset. This resulted in a set of 23M triples containing 1.1M distinct subject entities, which form the entity vocabulary and, respectively, the number of KPs in the following experiments.

The T5.1.1 model family was adopted for testing. Experiments were performed with three model sizes: small, base and large, which contain 60M, 220M and 770M parameters, respectively. T5.1.1 checkpoints were used that were adapted from the original T5.1.1 checkpoints by running an additional 100K training steps using the "LM" objective discussed in "Exploring the limits of transfer learning with a unified text-to-text transformer", by Raffel et all, Journal of Machine Learning Research, 21(140): 1-67, 2020.

It was noticed that these adapted checkpoints make the training of soft prompts easier. Although an encoder-decoder LM was used in testing, as noted herein the technology is not limited to this type of architecture and can be used with encoder only models, such as BERT, or decoder-only models like GPT2.

The input length for training KPs may be short because the examples were masked serialized triples (concatenation of Subject/Object entity and a relation). Therefore, the input length was set to 64, which allowed for use of very large batch sizes, e.g., between 4K and 8K, depending on the model size. Note that the objective when training KPs was to memorize the training data. Hence, KP training ran for up to 200 epochs.

In the beginning of the training, KPs were initialized by randomly sampling from the word embeddings matrix. This allowed KPs to start from a region that is known by the LM, which made the training smoother and less sensitive to hyperparameters. After training, KPs were kept frozen during LM finetuning for downstream tasks. Therefore, for each model size, the exact same set of KPs was used in the experiments with the different downstream tasks and datasets.

In all experiments where KPs were used, the input text was preprocessed using Google Cloud Natural Language API 1 to perform entity linking. Experiments were performed with three different knowledge intensive tasks: (1) question answering (QA), (2) fact checking and (3) relation classification. In terms of datasets, for QA experiments Entity Questions (see Sciavolino et al., "Simple entity-centric questions challenge dense retrievers", in Proceedings of the 2021 Conference on Empirical Methods in Natural Language Processing, pages 6138-6148) and TriviaQA (Joshi et al., "TriviaQA: A large scale distantly supervised challenge dataset for reading comprehension", in Proceedings of the 55th Annual Meeting of the Association for Computational Linguistics, pages 1601-1611, 2017) datasets. For fact checking, the FEVER dataset was used (Thorne et al., "FEVER: a large-scale dataset for fact extraction and VERification", in Proceedings of the 2018 Conference of the North American Chapter of the Association for Computational Linguistics: Human Language Technologies, Volume 1 (Long Papers), pages 809-819)). For relation classification, the TACRED dataset was used (Zhang et al., "Position-aware attention and supervised data improve slot filling", in Proceedings of the 2017 Conference on Empirical Methods in Natural Language Processing, pages 35-45).

In the question answering experiments, the closed-book QA (CBQA) setup was followed (Roberts et al., "How much knowledge can you pack into the parameters of a language model?", in Proceedings of the 2020 Conference on Empirical Methods in Natural Language Processing (EMNLP), pages 5418-5426). In this setup, the model has no access to external text, which means that there is no retrieval step and the model has to solve the task using the world knowledge it acquired from pretraining and finetuning data only. During training, the default hyperparameters were used as much as possible except for the learning rate, which was finetuned on the development sets. Exact matching (EM) was used as the evaluation metric in CBQA.

Figure 6A:
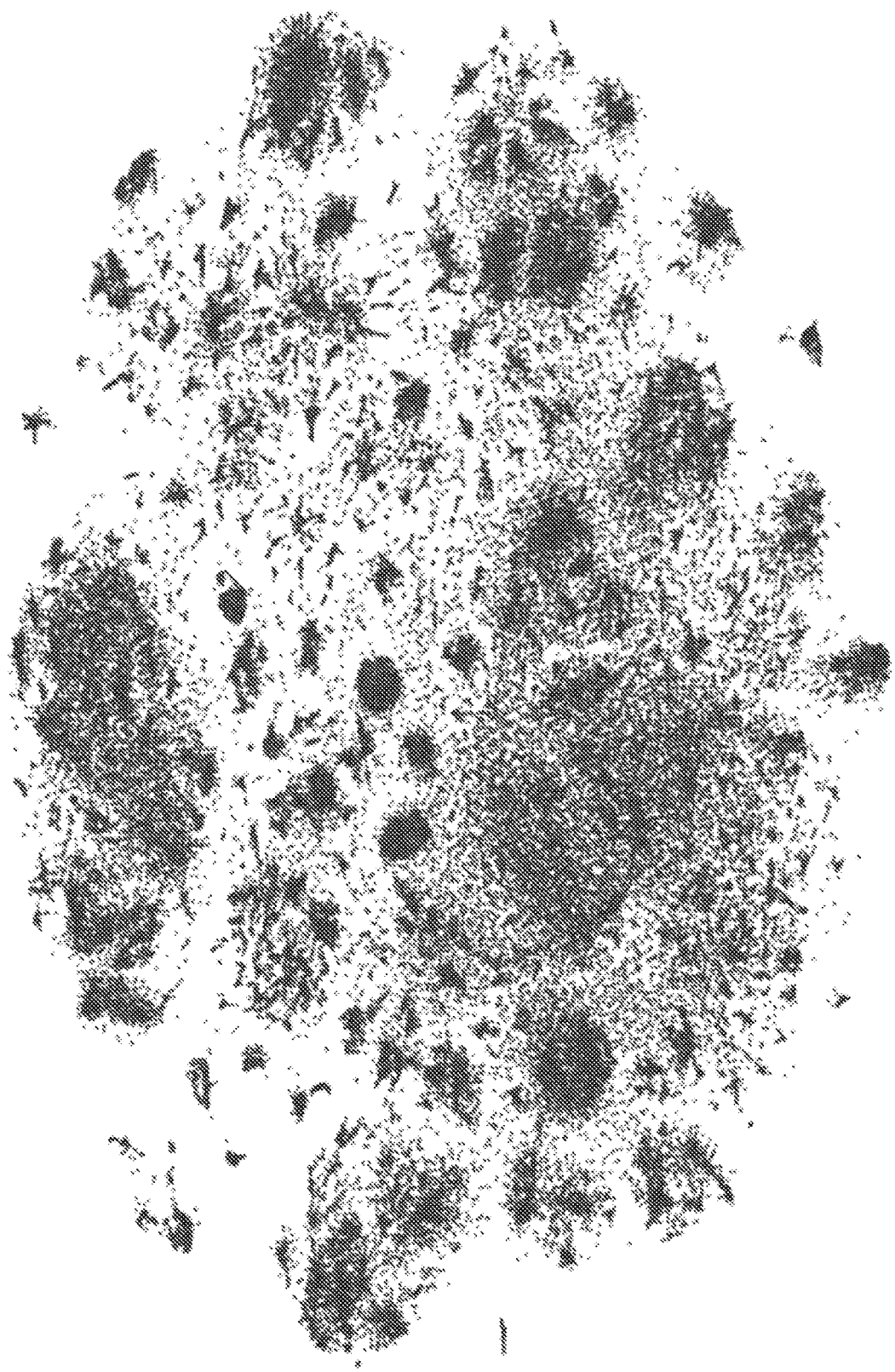
FIGS. 6A-C illustrate t-SNE visualizations of trained KPs in accordance with aspects of the technology.
Figure 6B:
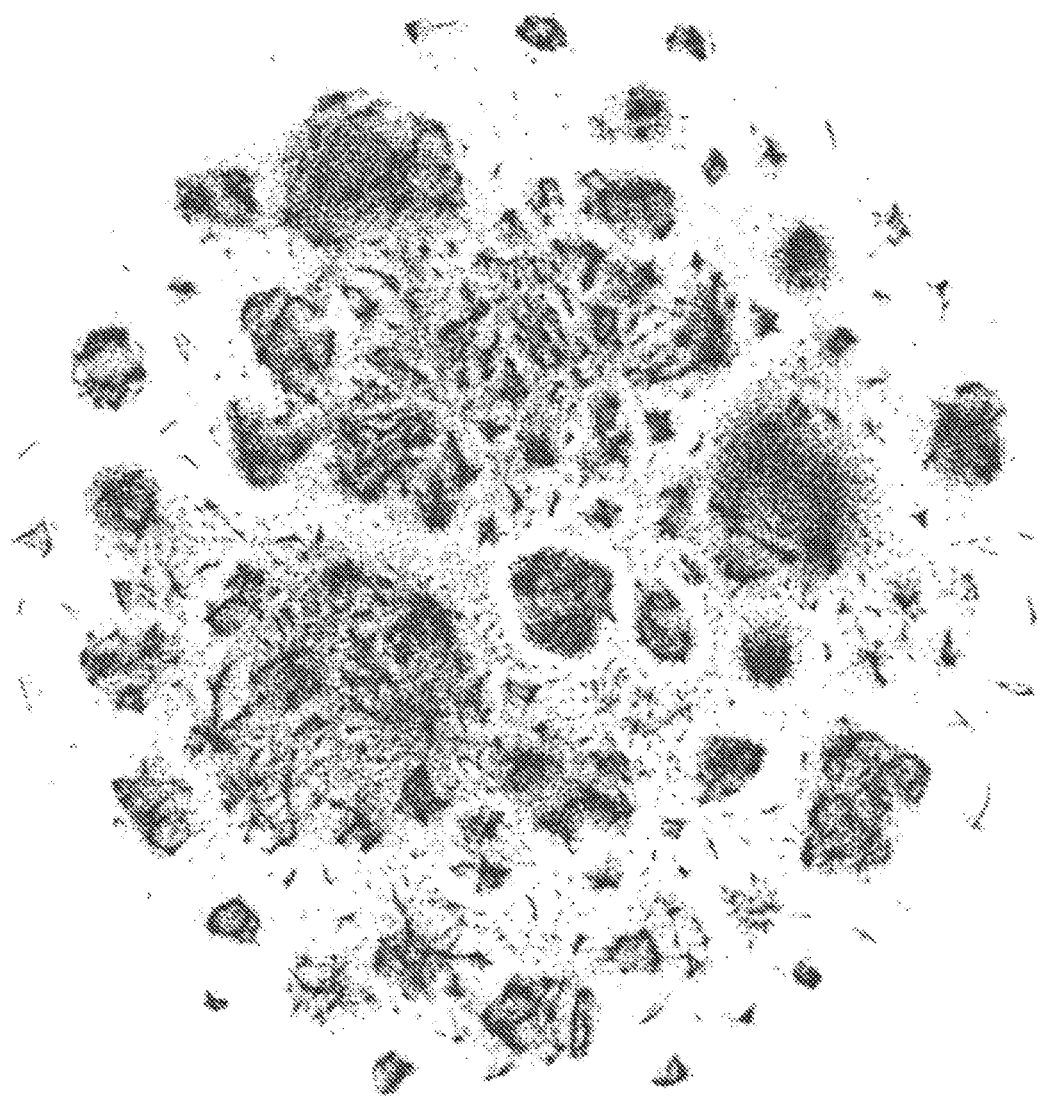

A qualitative assessment of KPs was performed through different experiments including t-SNE visualizations, analysis of entity similarity in KP space and evaluation of KPs for QA when golden entity linking was provided. One of the main goals in the qualitative assessment of KPs was to check whether the learned KPs can model the structure of the training data. An approach that can give clues about the data structure learning aspect are t-SNE visualizations. FIG. 6A, shows a t-SNE visualization of 100K randomly selected KPs that were trained using T5-BASE model on Wikidata triples. It can be seen here that KPs form multiple well separated clusters. FIG. 6B illustrates another t-SNE visualization.

Figure 6C:
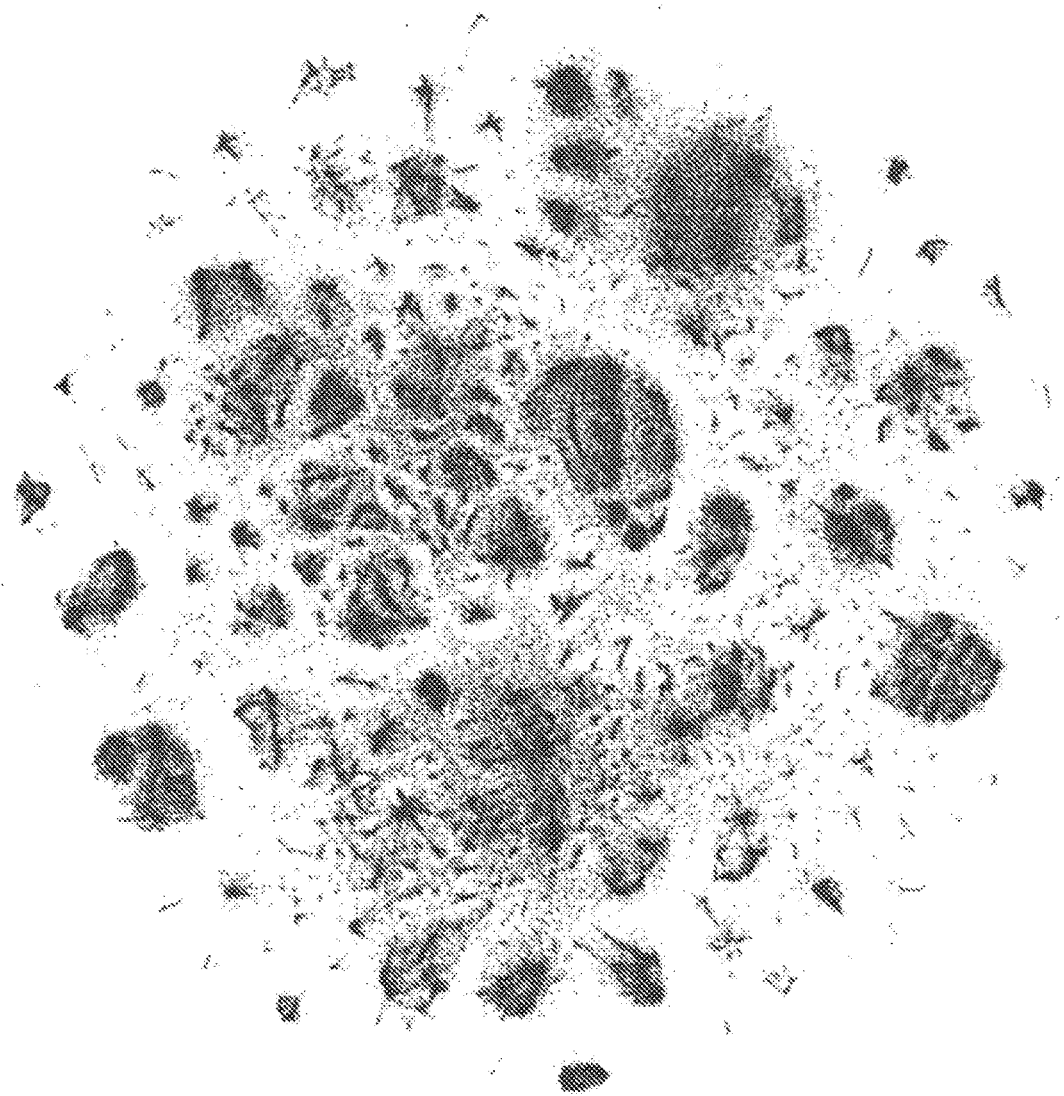

This image is of 230 k KPs learned on Wikidata triples, with a prompt size of 512. FIG. 6C illustrates yet another t-SNE visualization of the same 230 k KPs learned on Wikidata triples, with a prompt size of 1024. Zooming in into these clusters, one can notice that they are very coherent. There are clusters about companies, celestial objects, movies, locations, etc. This is a good indication that, although trained independently, KPs encapsulate a notion of similarity between entities that aligns well with the KB structure.

The testing also investigated the quality of the entity similarity captured by KPs using cosine similarity in the KP space to retrieve the k-nearest neighbors of different search entities and model sizes. In Table 1 of FIG. 7A, the top four neighbors of four different entities are shown. This presents results for T5 models of three different sizes. The top two entities (Barack Obama and Roger Waters) are cherry picked popular entities to make it easier for the reader to grasp the quality of the results. The bottom two entities (Fairmont station and Iacobeni, Sibiu) were randomly selected. The KP space learned by the three model sizes can produce high quality nearest neighbors for the four different entities. For instance, in the case of the search entity Fairmont station, which is a streetcar stop in Salt Lake City—Utah—USA, all the retrieve entities are also streetcar stops in Salt Lake City. Similar results can be seen for the other entities, where the retrieved neighbors share multiple properties (e.g., same occupation and nationality) with the search entity.

In order to assess in a controlled manner whether KPs can be used as a knowledge source for LMs, an experiment was performed on closed-book QA using the Simple Questions dataset (see Bordes et al., "Large-scale simple question answering with memory networks", CoRR, 2015). This dataset was a good fit because it contains golden information about the entity involved in the question (golden entity linking). The Simple Questions version was used that was processed by to align the original Freebase entities to Wikidata entities (see Diefenbach et al., "Question answering benchmarks for wikidata", in Proceedings of the ISWC 2017 Posters & Demonstrations and Industry Tracks co-located with 16th International Semantic Web Conference (ISWC 2017).

The dataset was further preprocessed to contain only questions involving one of the 1.1M entities for which KPs were trained. Table 2 of FIG. 7B presents two sets of experiments for models of different sizes. This compares LMs performances on Simple Questions with and without KPs as a knowledge source, measured by exact match (EM) score (%). The KPs were retrieved using golden entity linking information. Most performant results for each setup are marked in bold. In the first experiment it was checked whether the use of KPs can improve the performance of the models for zero-shot learning. In this scenario, one can see that T5 models without KPs performed very poorly and achieve exact match (EM) score of 0 percent. The use of KPs boosted the performance of all model sizes, with the base and large models achieving EM of 8.8. In the finetuning scenario, the use of KPs also brought a significant boost in performance. In particular, for T5-Base the improvement is of ~24 points in EM. However, it is known that the improvement is actually larger than this because for some questions there were multiple good answers (e.g., songwriter and singer are valid occupations for John Lennon), but the Simple Questions dataset listed only a single answer. These experimental results indicate that KPs are an effective approach to store information about entities in a way that can be readily used by the LM without any adaptation of the KPs for the downstream QA task.

Table 3 in FIG. 7C presents experimental results for two closed-book QA (CBQA) datasets and different T5 model sizes. In particular, this compares LMs performances on Entity Questions and TriviaQA with and without KPs as a knowledge source, measured by exact match (EM) score (%). It can be seen that KPs provide a significant performance improvement on the Entity Questions dataset, which is an entity-centric QA task. For instance, the improvement for T5-Base is of 7.7 points in EM. Interestingly, T5-SMALL+KPs outperformed T5-LARGE model by a large margin, 30.8 vs 26.7, respectively. Although to a smaller extent, KPs also brought performance improvements for all model sizes on TriviaQA dataset.

Table 4 of FIG. 7D compares the performance of T5-Base/Large+KPs with other recently published results on CBQA for TriviaQA. As best understood, there was no previous work that reported CBQA results for the Entity Questions dataset. T5+KPs model does not perform as well as the other CBQA approaches on TriviaQA. This may mainly be due to the following factors: (1) in EaE, TOME and T5-11B+SSM, the full LM is heavily pretrained on Wikipedia text using entity focused objective functions, which is known to make the model very effective to QA (see Guu et al., "REALM: Retrieval-augmented language model pre-training", arXiv preprint arXiv:2002.08909, 2020). In the disclosed approach method, an entity focused objective was used to train KPs only while the LM was frozen. Note in Table 3, the "no KPs column" as the initial baseline had poor results. Models like EaE and TOME update their external memory component during finetuning for a new task. The instant approach kept KPs frozen when finetuning for a new task. Moreover, the model from the instant approach is able to generate the answer token by token, which is more prone to errors compared to the entity retrieval approaches used in EaE and TOME. It is possible that additional pretraining steps may hurt the performance for CBQA.

Experimental results for the fact checking task are presented in Table 5 of FIG. 7E. This table compares LMs performances on fact checking dataset, FEVER (test split) with and without KPs as a knowledge source, measured by accuracy (%). Two baselines, Entities-as-Experts (see Févry et al., "Entities as experts: Sparse memory access with entity supervision", in Proceedings of the 2020 Conference on Empirical Methods in Natural Language Processing (EMNLP), pages 4937-4951) and MentionMemory (see de Jong et al., "Mention memory: incorporating textual knowledge into transformers through entity mention attention", in International Conference on Learning Representations, 2022) are included.

It can be seen here that the use of KPs brings significant improvements for the three model sizes on the FEVER dataset. Compared to recent works that use LMs with external memory, the instant T5-Base+KPs model has similar performance to EaE, and T5-LARGE+KPs achieves results competitive to TOME-2 model. TOME-2 achieves better results than EaE and T5+KPs because of the granularity of its memory. While TOME-2 has an external memory with 150M entries that store fine-grained information about entities, both EaE and the present model have a memory with about 1M entries only. The KP training method presented herein allows to increase the granularity of KPs in a straightforward manner. For instance, one can use multiple KPs per entity, where each KP is trained using a subset of the triples that mention the entity.

Table 6 of FIG. 7F presents experimental results for a relation classification task using the original TACRED dataset. Here, F1 was used as the metric, and results are presented for the test set. Similar to the other two tasks, in relation classification KPs also provide performance improvements for all three model sizes. Interestingly, T5-Base+KPs outperform T5-LARGE by almost one point in F1. Here, T5-Base+KPs achieves performance similar to EaE and is competitive with KnowBERT. It is important to note that KnowBERT uses entity types as input while both EaE and the present approach do not use that additional information.

As discussed above, KPs may be input directly to the encoder or to the decoder of a given language model. Table 7 of FIG. 7G presents a comparison of the results of KP→Encoder (see, e.g., FIG. 4B) and KP→Decoder (see, e.g., FIG. 4C) for the QA datasets. In both cases, KPs were trained using T5-Base model and results are presented for the dev set. Here, the KP→Encoder achieves better performance likely because it allows interaction (self-attention) between input and KPs in the encoder, which gives the model more opportunity to select and extract the correct information from KPs. On the other hand, the advantage of KP→Decoder is that its training is faster because it is a simpler optimization problem as the error does not have to be backpropagated through the frozen encoder and KPs are used via cross-attention in the decoder only. Note that in this testing, KP→Decoder required 3× less training iterations to converge compared to KP→Encoder.

Retrieving relevant KPs given an input is a fundamental task that has direct impact on the usefulness of KPs for various applications. Beyond entity linking, another approach to retrieve KPs is to transform the input into a single dense vector, then search for the most similar vectors in the KP space. Experiments have been conducted with this strategy by training an external encoder that creates a vector representation of the input. The external encoder has the same architecture and size of the respective T5 model. The TEKGEN dataset was used (see Agarwal et al., "Knowledge graph based synthetic corpus generation for knowledge-enhanced language model pre-training", in Proceedings of the 2021 Conference of the North American Chapter of the Association for Computational Linguistics: Human Language Technologies, pages 3554-3565), which contains Wikipedia sentences mapped to Wikidata triples, as a source of noisy-labeled data to train the encoder via contrastive loss. KPs are kept frozen during the training of the input encoder. Table 8 of FIG. 7H presents a comparison between T5+KP models that use either entity linking or search in the KP space. The results were computed on TriviaQA. One can see in the results that entity linking performed better for both model sizes. Here, searching in KP space may not work well because KPs are not optimized to be used in search. KPs are trained to memorize knowledge in a way that can later be extracted by the LM.

The contrastive loss or error may be determined according to the following equation:

$$L(h_i^{esp}, e_i) = -\log\left(\frac{\exp(h_i^{esp} \cdot e_i)}{\sum_{e_j \in B} \exp(h_i^{esp} \cdot e_j)}\right),$$

where $h^{esp}$ is the contextualized soft knowledge prompt, e, is the entity embedding of the entity appearing in the input i, and B is the set of soft knowledge prompts for all entities that appear in the current batch. Here, if input i contains multiple entities, $e_i$ can be the average embedding.

Self-Supervised Tasks for Learning LM-Compatible KPs

The following are different examples of self-supervised tasks in accordance with the above-described techniques. Note that the self-supervised tasks in the examples may assume that KPs are given as input to the decoder, but they could also be reformulated so that KPs can be given as input to encoder. By way of example only, data for the tasks could be obtained with the use of a knowledge base+web data. Furthermore, it may be desirable to train with multiple tasks at the same time. Here, four tasks are presented. The first involves knowledge base completion, the second involves a skip-gram model, the third predicts masked entities/relations, and the fourth predicts a sentence. The ultimate goal for these examples is to memorize the knowledge base in the soft knowledge prompts, but in a way that is useful for the language model.

Self-supervised Task 1 (KB completion): given an KB triple, mask one of the entities or the relation and predict the masked tokens. Here, the entity encoder input is: Peter Parker <M1> Mary Jane Watson, and the decoder input is: v1 v2 . . . vn e1 e2, where v1 to vn are the embeddings output by the encoder and e1 and e2 are the KPs of Peter Parker and Mary Jane Watson, respectively. The decoder output in this case would be: <M1> married to.

Self-supervised Task 2 (skip-gram model): predict entities/relations of a path (random walk) from a knowledge base (KB) given the entity in the center of the path. Here, a path example is: Mary Jane Watson→ married to→Peter Parker→superhero power→spidey sense. The encoder input is: Peter Parker, and the decoder input is: v1 v2 e1, where v1 and v2 are the embeddings output by the encoder for "Peter" and "Parker" and e1 is the KP of the entity "Peter Parker". The decoder output would be: Mary Jane Watson, married to, Peter Parker, superhero power spidey sense.

Self-supervised Task 3: predict masked entities/relations of a path from the KB. Here, the encoder input is: <M1> married to Peter Parker <M2> spidey sense, while the decoder input is: v1 v2 . . . vn e1 e2, where v1 to vn are the embeddings output by the encoder and e1 and e2 are the KPs of entities "Peter Parker" and "spidey sense", respectively. In this case, the decoder output is: <M1> Mary Jane Watson <M2> superhero power.

Self-supervised Task 4: given an entity, predict a sentence (from Wikipedia) where the entity appears. Here, a first encoder input is: Peter Parker, and the decoder input is: v1 v2 e1, where v1 and v2 are the embeddings output by the encoder for "Peter" and "Parker" and e1 is the KP of the entity "Peter Parker". In this case, the decoder output would be: [Peter Benjamin Parker] (created August 1962) is an American superhero who worked in New York from 1962 to 2023. In this example, assume a second encoder input is: United States, and the decoder input is: v1 v2 e1, where v1 and v2 are the embeddings output by the encoder for "United" and "States" and e1 is the KP of the entity "United States". Here the output would be: Peter Benjamin Parker (created August 1962) is an American superhero who worked in New York of the [United States] from 1962 to 2023, where in the output, square brackets are used to indicate the target entity to the model.

The above-described method and architecture for training soft prompts, which can be used to extend the world knowledge of LMs. The testing demonstrates the generality and usefulness of the resulting KPs by employing the same set of KP to improve the LM performance in three different tasks: question answering, fact checking, and relation classification. Although in this work a focus was on the use of KPs for injecting knowledge into LMs, entity-centric KPs may be suitable as a general-purpose knowledge base embedding approach.

Figure 8A:
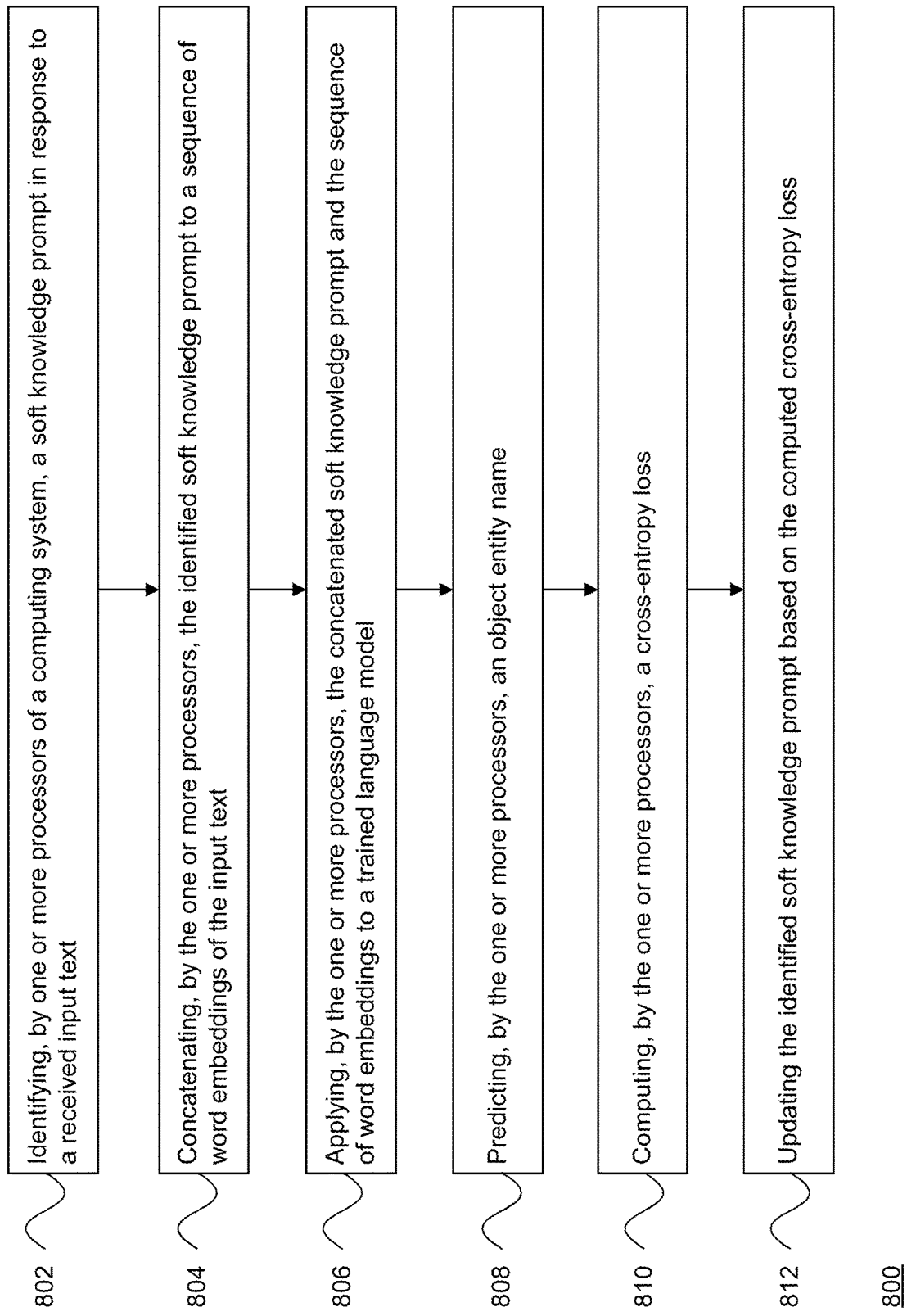
FIGS. 8A-B illustrate example methods in accordance with aspects of the technology.

FIG. 8A illustrates an example computer-implemented method 800 in accordance with aspects of the technology. The method includes, at block 802, identifying, by one or more processors of a computing system, a soft knowledge prompt in response to a received input text. Then at block 804 the method includes concatenating, by the one or more processors, the identified soft knowledge prompt to a sequence of word embeddings of the input text. At block 806 the method includes applying, by the one or more processors, the concatenated soft knowledge prompt and the sequence of word embeddings to a trained language model. Then at block 808 the method includes predicting, by the one or more processors, an object entity name, and at block 810 computing, by the one or more processors, a cross-entropy loss. At block 812 the method includes updating the identified soft knowledge prompt based on the computed cross-entropy loss.

Figure 8B:
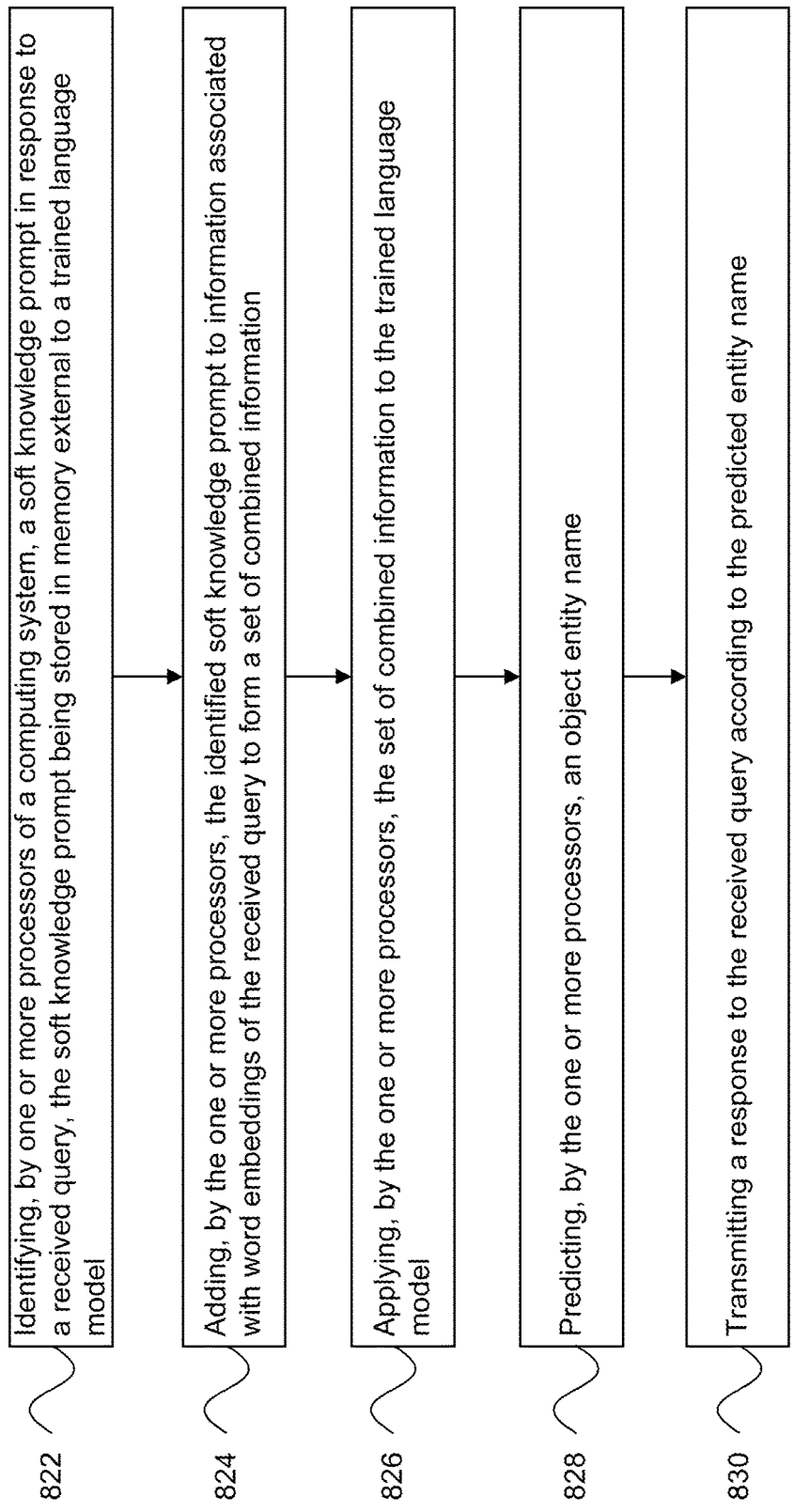

FIG. 8B illustrates another example computer-implemented method 820, which includes at block 822 identifying, by one or more processors of a computing system, a soft knowledge prompt in response to a received query. The soft knowledge prompt is stored in memory external to a trained language model. At block 824, the method includes adding, by the one or more processors, the identified soft knowledge prompt to information associated with word embeddings of the received query to form a set of combined information. At block 826 the method includes applying, by the one or more processors, the set of combined information to the trained language model, and at block 828 predicting, by the one or more processors, an object entity name. Then at block 830 the method includes transmitting a response to the received query according to the predicted entity name.

As discussed herein, the self-supervised approach to train knowledge driven soft prompts provides a technical benefit to the computing system by injecting world knowledge into LMs. The knowledge prompts can effectively model the structure of the training data and can also improve the performance of LMs on knowledge intensive tasks handled by the computing system. And it has been shown that soft prompts provide another technical benefit by storing data, which may be done as an alternative or in addition to storing instructions on how to solve specific tasks.

It can be seen that KPs allow a better control of what information is stored, by choosing what examples are used to train the KPs. KPs are trained independently, therefore the training can be massively parallelized. As the LM is kept frozen during the training of KPs, this does not affect the language generation/understanding capabilities of the LM. In addition, KPs can increase the capacity of small LMs in a dynamic way. The system can add or remove KPs at any time. Moreover, if information about a single entity changes, the system can update that entity's KP without changing other KPs. This addresses the freshness issue of the LMs.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method, comprising:
identifying, by one or more processors of a computing system, a soft knowledge prompt in response to a received input text, wherein the received input text masks an object entity;
concatenating, by the one or more processors, the identified soft knowledge prompt to a sequence of word embeddings of the input text;
applying, by the one or more processors, the concatenated soft knowledge prompt and the sequence of word embeddings to a trained language model;
predicting, by the one or more processors, an object entity name of the object entity;
computing, by the one or more processors, a cross-entropy loss according to the predicted object entity name;
updating the identified soft knowledge prompt based on the computed cross-entropy loss, wherein the updated soft knowledge prompt is configured to function as a part of an auxiliary memory of a language model that is activated when solving a specific task; and
disambiguating a named entity that appears in the received input text.

2. The computer-implemented method of claim 1, further comprising:
selecting the updated soft knowledge prompt in response to a received query;
applying the selected soft knowledge prompt to the trained model; and
transmitting a response to the received query.

3. The computer-implemented method of claim 1, wherein the trained language model is frozen prior to applying the concatenated soft knowledge prompt.

4. The computer-implemented method of claim 1, wherein the soft knowledge prompt is stored in external memory separate from the trained language model.

5. The computer-implemented method of claim 4, wherein the external memory is of variable size and a memory size of the trained language model is fixed.

6. The method of claim 1, wherein applying the concatenated soft knowledge prompt and the sequence of word embeddings to the trained language model is done as an input to an encoder of the trained language model.

7. The method of claim 1, wherein applying the concatenated soft knowledge prompt and the sequence of word embeddings to the trained language model is done as an input to a decoder of the trained language model.

8. The method of claim 1, wherein updating the identified soft knowledge prompt is done by back-propagating the computed cross-entropy loss through the trained language model.

9. The method of claim 1, wherein the cross-entropy loss is computed by applying max pooling and projection to vectors output by an encoder of the trained language model.

10. A computer-implemented method, comprising:
identifying, by one or more processors of a computing system, a soft knowledge prompt in response to a received query, the soft knowledge prompt being stored in memory external to a trained language model;
adding, by the one or more processors, the identified soft knowledge prompt to information associated with word embeddings of the received query to form a set of combined information, wherein the information associated with the word embeddings masks an object entity;

applying, by the one or more processors, the set of combined information to the trained language model;

predicting, by the one or more processors based on the set of combined information applied to the trained language model, an object entity name of the object entity;

transmitting a response to the received query according to the predicted entity name; and disambiguating a named entity that appears in the received query;

wherein the memory storing the soft knowledge prompt is configured to function as an auxiliary memory of the language model when the language model is activated to respond to the received query.

11. The method of claim 10, wherein the soft knowledge prompt is identified by an entity linker, and the method includes applying the identification by the entity linker to the memory to retrieve the soft knowledge prompt.

12. The method of claim 10, wherein applying the set of combined information to the trained language model is done as an input to an encoder of the trained language model.

13. The method of claim 10, wherein applying the set of combined information to the trained language model is done as an input to a decoder of the trained language model.

14. A computing system, comprising:
memory configured to store a set of soft knowledge prompts separate from a language model; and
one or more processors operatively coupled to the memory, the one or more processors being configured to:
identify a soft knowledge prompt in response to a received input text, wherein the received input text masks an object entity;
concatenate the identified soft knowledge prompt to a sequence of word embeddings of the input text;
apply the concatenated soft knowledge prompt and the sequence of word embeddings to a trained language model;
predict an object entity name of the object entity;
compute a cross-entropy loss according to the predicted object entity name;
update, in the memory, the identified soft knowledge prompt based on the computed cross-entropy loss, wherein the updated soft knowledge prompt is configured to augment the language model when solving a specific task; and disambiguate a named entity that appears in the received input text.

15. The computing system of claim 14, wherein application of the concatenated soft knowledge prompt and the sequence of word embeddings to the trained language model is done as an input to an encoder of the trained language model.

16. The computing system of claim 14, wherein application of the concatenated soft knowledge prompt and the sequence of word embeddings to the trained language model is done as an input to a decoder of the trained language model.

17. The computing system of claim 14, wherein the update of the identified soft knowledge prompt is done by back-propagating the computed cross-entropy loss through the trained language model.

18. The computing system of claim 14, wherein the cross-entropy loss is computed by applying max pooling and projection to vectors output by an encoder of the trained language model.

19. A computing system, comprising:
memory configured to store a set of soft knowledge prompts; and
one or more processors operatively coupled to the memory, the one or more processors being configured to:
identify a soft knowledge prompt in response to a received query, the soft knowledge prompt being stored in the memory that is external to a trained language model;
add the identified soft knowledge prompt to information associated with word embeddings of the received query to form a set of combined information, wherein the information associated with the word embeddings masks an object entity;
apply the set of combined information to the trained language model;
predict, based on the set of combined information applied to the trained language model, an object entity name of the object entity;
transmit a response to the received query according to the predicted entity name; and disambiguate a named entity that appears in the received query;
wherein the memory is configured to function as an auxiliary memory of the language model when the language model is activated to respond to the received query.

20. The computing system of claim 19, wherein application of the set of combined information to the trained language model is done as an input to an encoder of the trained language model.

21. The computing system of claim 19, wherein application of the set of combined information to the trained language model is done as an input to a decoder of the trained language model.

* * * * *